(12) United States Patent
Long et al.

(10) Patent No.: US 9,213,706 B2
(45) Date of Patent: *Dec. 15, 2015

(54) LIVE RESTORE FOR A DATA INTELLIGENT STORAGE SYSTEM

(71) Applicant: DataGravity, Inc., Nashua, NH (US)

(72) Inventors: Paula Long, Amherst, NH (US); Misha Zelikov, Needham, MA (US); Bryan Keith Panner, Windham, NH (US); Istvan Gonczi, Berkley, MA (US); Gregory James McHale, Hampstead, NH (US); Janice Ann Lacy, Shrewsbury, MA (US); Kumar Kanteti, South Grafton, MA (US)

(73) Assignee: DATAGRAVITY, INC., Nashua, NH (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/157,974

(22) Filed: Jan. 17, 2014

(65) Prior Publication Data

US 2014/0372384 A1 Dec. 18, 2014

Related U.S. Application Data

(63) Continuation-in-part of application No. 14/017,754, filed on Sep. 4, 2013, now Pat. No. 8,849,764.

(60) Provisional application No. 61/834,806, filed on Jun. 13, 2013.

(51) Int. Cl.
*G06F 17/30* (2006.01)
*G06F 7/00* (2006.01)
(Continued)

(52) U.S. Cl.
CPC ...... *G06F 17/30067* (2013.01); *G06F 11/1469* (2013.01); *G06F 17/3012* (2013.01); *G06F 17/30289* (2013.01); *G06F 17/30637* (2013.01); *G06F 11/1466* (2013.01); *G06F 11/2056* (2013.01)

(58) Field of Classification Search
CPC ............ G06F 17/30067; G06F 17/301; G06F 17/3012
See application file for complete search history.

(56) References Cited

U.S. PATENT DOCUMENTS 6,470,420 B1 * 10/2002 Hospodor ..................... 711/114
7,412,577 B2 8/2008 Boyd et al.
(Continued)

OTHER PUBLICATIONS

HDFS Users Guide <hadoop.apache.org/docs/current/hadoop-project-dist/hadoop-hdfs/HdfsUserGuide.html#Backup_Node> retrieved from the Internet Aug. 6, 2013, 7 pages.
(Continued)

*Primary Examiner* — Jeffrey A Burke
(74) *Attorney, Agent, or Firm* — Cesari and McKenna, LLP

(57) ABSTRACT

A single system merges primary data storage, data protection, and intelligence. Intelligence is provided through in-line data analytics, and data intelligence and analytics are gathered on protected data and prior analytics, and stored in discovery points, all without impacting performance of primary storage. Real-time analysis is done in-line with the HA processing, enabling a variety of data analytics that are then used as part of a live restore operation. Data content can be live restored at an object or block level. Data recovery begins with metadata restoration, followed by near-instantaneous access to "hot" regions of data being restored, allowing site operation to continue or resume while a restore is ongoing.

19 Claims, 25 Drawing Sheets

(51) Int. Cl.
  *G06F 11/14* (2006.01)
  *G06F 11/20* (2006.01)

(56) References Cited

U.S. PATENT DOCUMENTS

| | | | |
|---|---|---|---|
| 7,756,837 B2 | 7/2010 | Williams et al. | |
| 7,937,365 B2 | 5/2011 | Prahlad et al. | |
| 8,055,745 B2 | 11/2011 | Atluri | |
| 8,364,636 B2 * | 1/2013 | Newport et al. | 707/612 |
| 2003/0105852 A1 * | 6/2003 | Das et al. | 709/223 |
| 2003/0145045 A1 * | 7/2003 | Pellegrino et al. | 709/203 |
| 2005/0273654 A1 | 12/2005 | Chen et al. | |
| 2009/0037479 A1 * | 2/2009 | Bolik et al. | 707/200 |
| 2009/0083336 A1 | 3/2009 | Srinivasan | |
| 2010/0030791 A1 * | 2/2010 | Iverson et al. | 707/10 |
| 2010/0036895 A1 * | 2/2010 | Boyd et al. | 707/204 |
| 2010/0274767 A1 * | 10/2010 | Irisawa et al. | 707/654 |
| 2010/0293147 A1 * | 11/2010 | Snow et al. | 707/640 |
| 2011/0145207 A1 * | 6/2011 | Agrawal et al. | 707/692 |
| 2011/0264635 A1 * | 10/2011 | Yang | 707/695 |
| 2013/0007063 A1 * | 1/2013 | Kalra et al. | 707/796 |
| 2014/0040306 A1 | 2/2014 | Gluzman Peregrine et al. | |

OTHER PUBLICATIONS

HDFS Architecture <hadoop.apache.org/docs/current/hadoop-project-dist/hadoop-hdfs/HdfsDesign.html> retrieved from the Internet Aug. 6, 2013, 6 pages.

International Search Report and Written Opinion for International Application No. PCT/US2014/041486, International Filing Date Jun. 9, 2014 for DataGravity, Inc., mailed date Jul. 20, 2015, 28 pages.

* cited by examiner

ALGORITHM FileRestore (IN S_Path, IN S_DP, IN D_Path)

1. PREPARE FILE FOR RESTORE.
    a. CALL PrepareFileForRestore
    b. (SEE FIG. 15 FOR MORE DETAIL - CREATE AN EMPTY DESTINATION FILE D_Path AND MARK APPROPRIATE METADATA ALLOWING FOR THE LIVE RESTORE TO BE EXECUTED)
2. CALL IoToFileBeingRestored FOR USER I/O REQUESTS
    a. (SEE FIG. 17 FOR MORE DETAIL - ALLOW I/O ACCESS TO THE FILE PRIOR TO RESTORE COMPLETE)
3. START BACKGROUND RESTORE OF DATA
    a. FILE DATA IS RESTORED AS BACKGROUND PROCESS
    b. RESTORE I/O IS PERFORMED AT A BLOCK BY BLOCK LEVEL WITHIN THE FILE
    c. FOR EACH BLOCK RESTORE, THE RESTORED MAP RECORDS RESTORED BLOCKS
    d. BACKGROUND DATA RESTORE USING TWO PRINCIPLES TO PRIORITIZE
        i. BLOCKS BEING ACTIVELY RESTORED IN REAL-TIME
        ii. PREVIOUSLY GATHERED ANALYTICS FROM S_DP AT THE SUB-OBJECT AND BLOCK LEVEL
4. AS NEW DATA IS BEING WRITTEN TO THE FILE ACTIVELY BEING RESTORED, MIRROR THE NEW AND RESTORED DATA PROVING HA

*FIG. 14*

ALGORITHM PrepareFileForRestore (IN RestorePath, IN RestoreSource=<DPsource, OIDSource>, OUT FileOID)

1. OBTAIN SIZE TO BE RESTORED FROM RestoreSource
2. CREATE A NEW FILE RestorePath THAT WILL BE THE DESTINATION FOR THE RESTORE, AND OBTAIN ITS OBJECT ID, RETURNED IN FileOID
3. RESTORE METADATA ON THE FILE BEING RESTORED (PERMISSIONS, OWNERSHIP, ATTRIBUTES, ETC) FROM THE SOURCE
4. CREAT A RestoreLink FILE WITH ITS OBJECT ID RestoreLinkOID AND NAME "RL_<FileOID>"
5. SAVE RestoreSource, RESTORE SIZE, FileOID AND A ZERO-VALUE RESTORE BITMAP IN THE NEWLY CREATED RestoreLink FILE
6. SAVE RestoreLink FILE OID IN THE RestoreLinkOid ATTRIBUTE ON THE FILE TO BE RESTORED

FIG. 15

ALGORITHM IoToFileBeingRestored (IN FileOID, IN IO_Region, IN R_State, IN IO_Type: Read/Write)

1. DETERMINE THE RESTORE STATE OF THE BLOCK FROM R_State
2. IF THE REGION HAS NOT BEEN RESTORED, RESTORE THE BLOCK THAT OVERLAPS WITH THE USER I/O
   a. READ DATA OUT OF THE SOURCE FILE AND WRITE IT TO THE DESTINATION - THE PRIMARY AND HA MIRRORED COPY
   b. UPDATE THE RESTORE BITMAP IN CORRESPONDING RestoreLink FILE MARKING A REGION RESTORE COMPLETION
   c. IF ALL BLOCKS ARE RESTORED COMPLETE THE RESTORATION PROCESS
      i. DELETE RestoreLink FILE
      ii. MARK FILE RESTORATION BEING DONE BY DELATING OR INVALIDATING RestoreLinkOID
3. PROCESSED AS A NORMAL USER I/O
   a. IN CASE IF READ M OBTAIN THE DATA AND RETURN TO THE USER
   b. IN CASE OF A WRITE UPDATE PRIMARY AND HA MIRROR COPY OF THE DATA

FIG. 17

ALGORITHM DirectoryLiveRestore (IN RestoreSourceDp, IN RestoreSourceDir, IN RestorePathDir)

1. FOR EACH SUB-DIRECTORY S IN RestoreSourceDir
    a. ATOMICALLY CREAT SUB-DIRECTORY S IN THE RestorePathDir:
        i. CREATE S
        ii. RESTORE METADATA OF S FROM THE SOURCE <RestoreSourceDp, RestoreSourceDir>
        iii. RECORD AN ATTRIBUTE RestoreInProgress ON S
    b. CALL DirectoryLiveRestore(RestoreSourceDp, COMPLETE PATH FOR S IN RestoreSourceDir, COMPLETE PATH FOR S IN RestorePathDir)
2. CALL DirectoryContentLiveRestore(RestoreSourceDp, RestoreSourceDir, RestorePathDir)

FIG. 18

ALGORITHM BlockLiveRestore (IN RestoreExtentMap, IN Site_P, IN Site_R)

1. FOR EACH EXTENT IN RestoreExtentMap, READ DATA FROM THE REMOTE LOCATION Site_R AND COPY IT LOCALLY TO Site _P
2. UPDATE RestoreExtentMap WITH THE INFORMATION ABOUT EXTENTS THAT HAVE BEEN RESTORED

*FIG. 20*

ALGORITHM SiteRestore (IN Site_P, IN Site_R)

1. CONFIGURE VIRTUAL DISK LAYER AT SITE P MATCHING CONFIGURATION OF WHAT IS BEING PRESENTED BY VDL AT SITE R.
2. IDENTIFY ALLOCATED/USED METADATA EXTENTS AT SITE R
    a. COPY THEM TO THE CORRESPONDING VIRTUAL DEVICE (S) TO SITE P.
    b. FSL ON SITE P IS READY TO PERFORM ITS OPERATIONS THAT DO NOT INVOLVE USER DATA.
3. OBTAIN INFORMATION ABOUT ALLOCATED/USED DATA EXTENTS FROM THE VDL AT SITE R.
    a. TRANSFER THIS TO THE VDL AT SITE P TO FORM RESTORE EXTENT MAP
4. PERFORM FILE SYSTEM PRUNING.
    a. USER IDENTIFIES FILE SYSTEMS THAT DO NOT NEED TO BE RESTORED.
    b. DESTROY NOT NEEDED DISCOVERY POINTS
        i. IF SITE P IS A PRIMARY CONTROLLER/SYSTEM, THEN ALL DISCOVERY POINTS ARE DESTROYED.
        ii. IF SITE P IS AN INTELLIGENCE CONTROLLER/SYSTEM, THEN USER CHOSEN DISCOVERY POINTS ATE RETAINED, WHILE THE REST ARE DESTROYED.
    c. DELETION OF FILES, SYSTEMS, AND DISCOVERY POINTS ARE FSL-LEVEL MANAGEMENT OPERATIONS THAT RESULT IN FSL METADATA AT SITE P BEING MODIFIED
5. AN EFFECT OF DELETION IS THAT FSL MIGHT DECLARE SOME OF THE DATA BLOCKS AS BEING NO LONGER IN USE RESULTING IN TRIM OPERATIONS.
6. AS FSL ISSUES TRIM OPERATIONS, VDL UPDATES ITS RESTORE EXTENT MAP, MARKING EXTENTS NOT NEEDED FOR THE RESTORE.
7. SCHEDULE BACKGROUND BlockLiveRestore BASED ON THE INFORMATION IN THE RESTORE EXTENT BITMAP.
8. ALLOW ACCESS TO FILE SYSTEMS BY USERS.

FIG. 23

LIVE RESTORE FOR A DATA INTELLIGENT STORAGE SYSTEM

CROSS-REFERENCE TO RELATED APPLICATIONS

This utility patent application claims priority from U.S. provisional patent application Ser. No. 61/834,806, filed Jun. 13, 2013, titled "SYSTEM AND METHOD OF DATA INTELLIGENT STORAGE" in the name of Paula Long, Bryan Keith Panner, Eric K. McCall, Dmitry Bochkov, Gregory James McHale, Janice Ann Lacy, Istvan Gonczi, Andrew Ferris, and Misha Zelikov, and claims priority from and is a continuation-in-part of U.S. utility patent application Ser. No. 14/017,754 filed Sep. 4, 2013 titled "SYSTEM AND METHOD OF DATA INTELLIGENT STORAGE" in the name of Misha Zelikov, Paula Long, Bryan Keith Panner, Dmitry Bochkov, Andrew Ferris, and Eric K. McCall. The entire contents of each of the above-referenced patent applications are hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2013, Data Gravity, Inc.

BACKGROUND

1. Field of Technology

This disclosure relates to computer storage systems, and more particularly to live data restoration in methods and systems that unify primary storage, data protection, and data analytics functions.

2. Background

Data storage solutions are large business and in large demand for many enterprises. Storage solutions are often designed for specific purposes, and companies often utilize separate systems as data silos dedicated to such purposes, such as primary storage (block and file), backup storage, and storage for analytics. These three copies of storage are generally kept on different devices and managed separately. The movement of data between these three silos can be difficult because there is time involved in determining what changed between the primary silo and backup or analytics silo. This leads to complex backup strategies that attempt to compensate for the length of time required to move the data to the backup and analytics silos. The involved timing covers both determination of what has changed since the last time the data was captured, and moving the data to the new silos typically over a network of some type. This process is usually resource intensive on the primary storage system, consuming critical primary storage resources such as processor cycles, memory, disk operations, and network bandwidth. For this reason, the data move to backup and analytics is often scheduled for off hours and carefully managed to not interfere with daily operations. In addition to processing and timing complications in moving data to backup and analytics systems, restore operations required in the case of failure or loss of primary data can also be time consuming. Further, while the restore operation is occurring primary data is generally not accessible.

In addition to the above timing and computation issues, analytics systems today, such as those using Hadoop, are independent of the primary storage system in terms of security and user account context. This complicates protection to data access, and generally loses context of when the changes occurred and who made the changes. Many systems also require multiple layers of additional third-party software to extract any information from the data.

Backup systems traditionally focus on recovery point objective (RPO) and recovery time objective (RTO). RPO represents the maximum time period of acceptable risk of data loss—for example, an RPO of 24 hours means on failure of primary storage, up to 24 hours of data might be lost and unrecoverable. RTO represents the maximum acceptable time for recovery after a failure before operation can resume—for example, an RTO of 24 hours mean on failure of primary storage, restoration from backup will take up to 24 hours before the primary system is restored and can resume normal operation.

Recovering or restoring from a backup system is generally a difficult and time-consuming process. Recovering from backup generally requires identifying a file (or set of files) and a timestamp (date). If the date or file is unknown, the already time-intensive restoration process becomes greatly more complex. Searching data within a backup system to identify a desired restoration without knowledge of the file and date is generally a trial-and-error process, such as picking a date, restoring the backup from that date, searching the restored data to identify if the data includes the desired item, and repeating the process until the desired item is found.

Once a desired file is identified, a restore process starts. Access to the file is typically not granted until the entire restore process is completed. This might result in many minutes or even hours of wait time before users can start using the restored data. This time can be significantly extended due to storage optimization techniques used when storing backup data. For example, to maximize backup capacity backups may be compressed, requiring intensive (and often complete-site) restoration to recover a single file.

There is some movement to merge backup and analytics systems into a single system which uses the backup data for analytics. This has encountered additional problems, as typically backup systems do not keep data in the same format as primary storage. Even if the format is not a problem, issues remain with moving the data and breaking the connection between the primary storage and change insights. Additionally, applying analytics to backup data has not overcome the problems around determining time and authorship of changes.

3. Description of Prior Art

U.S. Pat. No. 7,412,577 "SHARED DATA MIRRORING APPARATUS, METHOD, AND SYSTEM" (Boyd et al., Aug. 12, 2008) discloses, in the Abstract, "A network component is useful in tracking write activity by writing logs containing write address information is described. The tracking component may be used in networked systems employing data mirroring to record data block addresses written to a primary storage volume during the time a data mirror is unavailable . . . . At the time a data mirror is reconstructed, the log written may be used to construct a list of block addresses pointing to locations on a primary storage volume wherein data differs from a secondary storage volume member of the mirror." This solution improves data mirroring within a storage network.

U.S. Pat. No. 7,756,837 "METHODS AND APPARATUS FOR SEARCHING BACKUP DATA BASED ON CONTENT AND ATTRIBUTES" (Williams et al., Jul. 13, 2010) discloses, in the Abstract, "Methods and apparatus are disclosed that permit the transparent bridging of a broad range of backup storage devices, such that backup software will identify an intermediate device as a one of those storage devices and will transparently send their backup data-stream thereto as part of the existing standard backup process. Upon receipt of a backup data-stream from the backup software, the methods and apparatus provide for analysis of the data elements in the data-stream, collection of management information about those data elements, and storage of the management information in an easily accessible format for subsequent review and query by users and administrators of the original data." This solution provides indexing and search capabilities to backup data.

U.S. Pat. No. 7,937,365 "METHOD AND SYSTEM FOR SEARCHING STORED DATA" (Prahlad et al., May 3, 2011) discloses, in the Abstract, "Systems and methods for managing data associated with a data storage component coupled to multiple computers over a network are further disclosed. Additionally, systems and methods for accessing documents available through a network, wherein the documents are stored on one or more data storage devices coupled to the network, are disclosed." This solution provides indexing, search, and access to data across multiple repositories including secondary storage.

United States Patent Application Publication 2009/0083336 "SEARCH BASED DATA MANAGEMENT" (Srinivasan, Mar. 26, 2009) discloses, in the Abstract, "The invention includes a system including one or more storage devices including the data items a metadata tagging component for associating metadata to each data item, a policy component defining one or more data management policies as a function of the metadata, a search engine for generating a list of data items satisfying the data management policy, and a data management application for applying the data management policy to each data item in the list of data items generated by the search engine." This solution creates metadata for "a priority . . . , a owner . . . , a group . . . , a last accessed time . . . , a last modified time . . . , a created time . . . , an archival time . . . , a logical location . . . , and a physical location of the data item." A search is performed of the metadata, and backup, retention, and archiving rules are applied to the search results.

U.S. Pat. No. 8,055,745 "METHODS AND APPARATUS FOR ACCESSING DATA FROM A PRIMARY DATA STORAGE SYSTEM FOR SECONDARY STORAGE" (Atluri, Nov. 8, 2011) discloses, in the Abstract, "A system for providing secondary data storage and recovery services for one or more networked host nodes includes a server application for facilitating data backup and recovery services; a first data storage medium accessible to the server application, a second data storage medium accessible to the server application; at least one client application for mapping write locations allocated by the first data storage medium to write locations representing a logical view of the first data storage medium; and at least one machine instruction enabling direct read capability of the first data storage medium by the server application for purposes of subsequent time-based storage of the read data into the secondary data medium." This solution splits (mirrors) data between primary and backup storage, providing continuous backup rather than discrete (backup-window) backups. Metadata including "source address, destination address, LUN, frame sequence number, offset location, length of payload, and time received" specific to every data frame is tracked, details of which are used in verification and compression.

European Patent Publication EP0410630B1 according to the Abstract discloses an apparatus and method for scheduling the storage backup of data sets in either an application or system-managed storage context using an algorithm in which less data and a smaller backup interval (window) are involved other than that used with prior art full, incremental or combination backup policies. An incremental backup policy is sensitive to a pair of adjustable parameters relating to the last backup, last update, and current date affecting each data set and its storage group.

United States Patent Publication 2006/0117048 according to the Abstract discloses a method and system for updating a filter's data after the filter's metadata file is restored. The filter maintains an open handle to the metadata until the filter receives a request to have the metadata restored. The filter then closes the open handle and allows the metadata to be restored. After the metadata is restored, data associated with the filter is rebuilt based on the restored metadata.

United States Patent Publication 2013/0054523 according to the Abstract discloses data objects replicated from a source storage managed by a source server to a target storage managed by a target server. A source list is built of objects at the source server to replicate to the target server. The target server is queried to obtain a target list of objects at the target server. A replication list is built indicating objects on the source list not included on the target list to transfer to the target server. For each object in the replication list, data for the object not already at the target storage is sent to the target server and metadata on the object is sent to the target server to cause the target server to include the metadata in an entry for the object in a target server replication database. An entry for the object is added to a source server replication database.

U.S. Pat. No. 7,376,895 according to the Abstract discloses an integrated multi-application data processing system for generating, storing, and retrieving data files, each data file having a multi-dimensional array of data cells, and a program framework providing a common user interface for at least one application program for user interaction with one or more of the data files. Each of the data cells, which can contain a single data object that includes an object type code and object content, has a unique multi-dimensional cell address with respect to all cells in data files generated by the system. The object content can be self-contained and/or defined in terms of object content of other data objects.

U.S. Pat. No. 7,552,358 according to the Abstract discloses a method for efficient backup and restore using metadata mapping which comprises maintaining a first backup aggregation associated with a primary data object of a primary host at a secondary host, wherein the first backup aggregation includes a first backup version of the primary data object stored within a secondary data object at the secondary host. The method further comprises generating a second backup aggregation, wherein the second backup aggregation includes a second backup version of the primary data object and a backup metadata object corresponding to the secondary data object. The backup metadata object includes a pointer to the second backup version. The method may further comprise restoring the secondary data object, wherein said restoring comprises using the pointer to access the second backup version of the primary data object to restore at least a portion of the secondary data object.

U.S. Pat. No. 8,032,707 according to the Abstract discloses techniques for managing cache metadata providing a mapping between addresses on a storage medium (e.g., disk storage) and corresponding addresses on a cache device at data items are stored. In some embodiments, cache metadata may be stored in a hierarchical data structure comprising a plurality of hierarchy levels. Only a subset of the plurality of hierarchy levels may be loaded to memory, thereby reducing the memory "footprint" of cache metadata and expediting the process of restoring the cache metadata during startup operations. Startup may be further expedited by using cache metadata to perform operations associated with reboot. Thereafter, as requests to read data items on the storage medium are processed using cache metadata to identify addresses at which the data items are stored in cache, the identified addresses may be stored in memory.

U.S. Pat. No. 8,140,573 according to the Abstract discloses that a metadata file can be automatically generated based on a database instance and a user defined maximum depth. The relationships between data objects that constitute a business object may be visualized in a tree. The maximum depth limits the number of levels in the tree to traverse. A metadata file describes the structure of a business object and relationships between sets of data objects that constitute the business object. The structure defined in the metadata file can be used to export instances of the business object from the database. The exported business object instances can be imported to another database.

BRIEF SUMMARY

None of the above provides a storage solution with 1) integrated primary storage, data protection, and data analytics which uses the analytics as part of a live restore process; 2) restoring metadata as a first step immediately allowing access to objects before a complete file, directory, block, or site level restore operation is complete; 3) prioritizes regions of user data being restored based on previously gathered in-line analytics; 4) uses a restore link data structure to maintain relationships between a file being restored in a primary pool, its source data in an intelligence pool, and discovery point data containing previously gathered analytics; 5) efficiently uses live block level restore operations for analogous restore at a site level, all without requiring separate backup data streams, or additional servers and software to coordinate operations between multiple systems. What is needed, therefore, is a solution that overcomes the above-mentioned limitations and that includes the features enumerated above.

The techniques disclosed herein merge primary data storage, data protection, and intelligence into a single unified system. The unified system provides primary storage, analytics, and analytics-based data protection without requiring separate solutions for each aspect. Intelligence is provided through inline data analytics, with additional data intelligence and analytics gathered on protected data and prior analytics, and stored in discovery points, all without impacting performance of primary storage. As data is written, it is mirrored as part of high availability (HA) processing. Real-time analysis is done in-line with the HA processing, enabling a variety of data analytics. Data content can be mined from within files or blocks. The gathered intelligence is used to tag objects with extended metadata, enabling both valuable search options and rapid restore options. Data recovery begins with metadata restoration, followed by near-instantaneous access to "hot" regions of data being restored, allowing site operation to continue or resume while a restore is ongoing.

With the disclosed system, a primary storage processor works in conjunction with an intelligence processor to store and protect the data on separate sets of disks while gathering intelligence as the data is created. Thus the disclosed storage system manages primary and HA stream data, the ability to extract information about the data, the data usage, and collects analytics around the data content. By using a single HA storage system to manage everything, processors and IO capacity normally dormant or underutilized may be put to use for gathering data intelligence, data protection, and delivering search and analytics. Data extraction may include metadata extraction, content extraction, and fine grain block-level access and change tracking. For file based primary storage, analysis may track file and metadata changes, including block-level changes, as data is written. For block based primary storage, analysis may track block level access and changes. Further, the system is capable of understanding data in a higher level application stream context, and performing tracking and analysis at a block level that is similar to file level analysis. This enables stream-level analysis such as for data being stored to a database. As data is written to intelligence storage, a copy of the data that is in memory is analyzed in parallel for data intelligence. Unlike traditional systems that are constrained by speed of data movement, this architecture allows for rapid processing of the data. Using this initial intelligence scan of the data, the data can then be post processed to gather more in-depth insights.

Analytics are available in near real time for end users. Preprocessed data is stored as incremental metadata to individual data objects and in separate data structures that can be queried. Unlike traditional data analytics systems, intelligence is not completely separated from the original data source. Analytics metadata is stored within discovery points. Each discovery point contains the analytics for the accessed and changed data associated with that discovery point, and optionally a copy of the data that has changed since a prior discovery point. By keeping the most commonly used intelligence as part of the metadata, the disclosed system reduces the response time to end users' requests for intelligence dramatically. The system also has access to added features of the data: who accessed or made a data change and when was the data accessed or changed. These added features allow the intelligence system to provide additional context for search and analysis.

An HA stream is used to create intelligence data, thereby providing a source for both data analytics and real-time protection of the customer data. Discovery points are created through the intelligence system based on the intelligence data, not primary storage data, which removes impact on primary storage during discovery point creation. Discovery points are stored on separate storage media from storage of the primary data stream. Discovery point creation can be based on time, but also can be analytically implemented based on an adaptive schedule. This adaptive behavior is achieved by actively monitoring access, changes, and change rates over time. This is done at a share or volume level and may take into account who owns and who accesses the data. The adaptive schedule may create discovery points as a result of hitting a threshold of percent change across the total data or across a designated portion of the total data, or after detecting anomalies in the amount of data changes based on historical analysis of data change rates over time.

Retaining data within a discovery point enables live data recovery processes. However, from a recovery standpoint, traditional RPO is changed. Discovery points are created based on the intelligence data, which removes impact on primary storage during discovery point creation. This protects data in real-time, reducing RPO to zero.

The system additionally minimizes RTO to near zero.

Two options for restoring data are available—object level restores or full site restores.

Object level restore recovers metadata using data and intelligence metadata about an object within a discovery point. An object can be a file, directory, file share, volume, or a file or directory within a complex object such as a file within a file system within a virtual machine disk (VMDK), or a directory within an archive. As soon as the metadata is restored for primary storage, the object appears restored to end users with input/output (I/O) access granted. "Hot" data within the object, such as user data actively being accessed by an end user or identified as prioritized for fast recovery based on previously gathered analytics over time, is restored with priority to primary storage, while any remaining data is back-filled with lower priority, ensuring the object will be fully restored. Data accessed within the object during the restore may have a slight access performance reduction, but availability of the restored object is near immediate.

Site level restore is to recover an entire site or portion of site, such as after a complete or partial failure of primary storage. A site level restore is not as instant as an object level restore, but is structured to enable site operation to resume quickly, potentially within a matter of minutes. Traditional RTO is measured in days and hours. With a site level restore, internal system metadata is quickly recreated for the site being restored, after which end users may access data. As in the object level restore case, "hot" data being actively accessed or analytically identified is given priority for data restoration while other data is back-filled at lower priority, guaranteeing eventual complete restoration while also enabling rapid access for recovered functionality. Site level restores, typically implemented as block level operations, could take longer than object level restores before end user operation can continue due to the larger scale of metadata required.

With either Object or Site level restore, while a restoration is in process, new data changes may be made. All new changes are tracked and protected, and analytics gathered, even if the entire restoration has not completed.

Features and Advantages

The disclosed system combines primary storage, data analytics, data protection, and recovery into one system.

The disclosed system does not require additional data streams, additional servers or other appliances, or additional software to be deployed beyond the ones traditionally found in primary storage environments.

The disclosed system tracks data changes in real-time, which eliminates pre-processing needed to perform data protection and avoids post-processing of data to detect changes or querying application servers for data changes.

The disclosed system creates a full text index of stored data, along with automatically created metadata tags which classify the data. This tagging enhances the data discovery process.

The disclosed system retains analytics metadata for accessed and changed data and, optionally, data changes in discovery points.

The disclosed system extends discovery point creation to be time based, percentage based, and analytically adaptive. The system maintains a current working version of content changes from the last discovery point, removing any risk-of-loss window on primary storage failure.

The disclosed system eliminates back-up windows and back-up scheduling.

The disclosed system provides immediate data protection through real-time redundancy of primary data.

The disclosed system creates content-specific intelligence of stored data, allowing for rapid search and identification of desired discovery points and data within them.

The disclosed system enables real-time selective restore based on search of gathered data intelligence.

The disclosed system tracks a rich set of operational behavior over time on the data such as access patterns of users to allow for tracking maps of content to people.

The disclosed system may include off-site archival storage in addition to on-site data protection, enabling both rapid recovery and long-term storage while maintaining near instant restore, analytics, and searchability on the local site.

The disclosed system enables data intelligence gathering and analytics without any impact to primary storage performance or availability.

The disclosed system provides a programming interface allowing connection by third party data intelligence packages. This includes custom defined application programming interfaces (APIs) as well as using traditional file and block access to manage, such as search, query status, etc., and retrieve analytics.

The disclosed system enables near-instantaneous access to data, such as individual files, directories, or file systems, being restored.

The disclosed system significantly reduces the time to resume operation after initiating a full site recovery in case of complete primary or intelligence system loss.

BRIEF DESCRIPTION OF THE DRAWINGS

In the drawings, closely related figures and items have the same number but different alphabetic suffixes. Processes, states, statuses, and databases are named for their respective functions.

FIG. 14 is an algorithm for live restore of a file.

FIG. 15 is an algorithm for preparing a file for live restore.

FIG. 17 is an algorithm for handling user I/O to a file that is still in the process of being live restored.

FIG. 18 is an algorithm for directory level restore.

FIG. 20 is an algorithm for block level live restore.

FIG. 23 is a site level restore algorithm.

DETAILED DESCRIPTION OF A PREFERRED EMBODIMENT

Terminology

Figure 1:
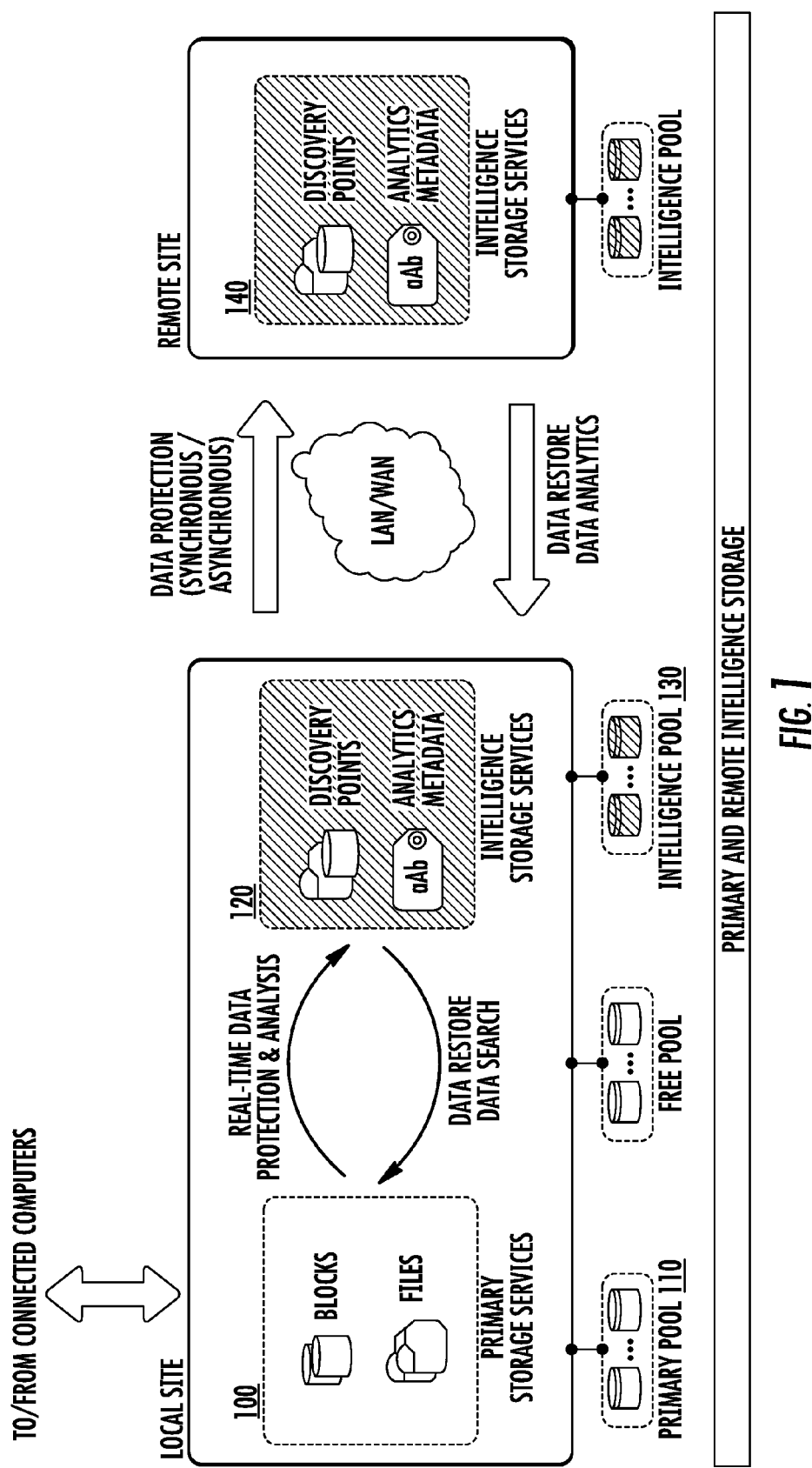
FIG. 1 is a diagram showing interaction between a Primary Node, Intelligence Node, and Remote Intelligence Node, and connected storage pools.

The terminology and definitions of the prior art are not necessarily consistent with the terminology and definitions used herein. Where there is a conflict, the following definitions apply.

The present application concerns live restore techniques, and in particular how object level live restore and block level live restore are performed. It would also concerns how previously gathered, over-time analytics can enable prioritizing of "hot" regions during live restore. Here, the definition of "hot" regions is changed from a traditional, access-based definition to instead take into account content, identity, rules, etc.

Terminology

The terminology and definitions of the prior art are not necessarily consistent with the terminology and definitions used herein. Where there is a conflict, the following definitions apply.

Primary Storage: networked storage accessible to multiple computers/workstations. The storage can be accessed via any networked device, either as files or blocks. Unless explicitly stated, "primary storage" refers to both blocks and files.

Intelligence Storage: secondary storage containing gathered intelligence, discovery points, and a redundant real-time copy of files and block data contained in Primary Storage.

Primary Node: includes access protocols to communicate with an Intelligence Node, Remote Sites, and Expansion Nodes; access protocols layer (for example, NFS, SMB, iSCSI); protection and analytics in real-time ("PART") layer; file and block storage layer (file system, block volume); and connection to storage devices (RAID, DISK, etc.). A Primary Node appears to system users as Primary Storage, and provides an interface and controls to act as the access to Intelligence Storage.

Intelligence Node: includes access protocols to communicate with a Primary Node, Remote Sites, and Expansion Nodes; data intelligence storage layer (intelligent data services & rules processing); file and block storage layer (file system, block volume); and connection to storage devices (RAID, long-term storage). In the preferred embodiment, intelligence node data is accessed by users through a Primary Node, but in alternate embodiments Intelligence Nodes may be directly accessed by users.

Discovery Point: A discovery point, created from a mirrored (high availability) copy of primary data, contains data analytics for accessed and changed primary data since a prior discovery point. A discovery point may contain the changed data, providing for a virtually full but physically sparse copy of the primary data captured at a user-specified point in time or dynamically based on change rate or other analytics. While primary data does not change within a discovery point after the discovery point was created, analytics metadata stored in a discovery point can be expanded as deeper levels of user data analysis are performed and more analytics are gathered. Tracked primary data changes can be retained for the life of the discovery point or can be removed at scheduled or dynamic intervals, such as after deep data analysis is complete and desired analytics metadata is obtained. Removing primary data allows for more efficient space utilization, while retaining primary data enables point-in-time recovery of that version of data.

Change Catalog: an ordered set of real-time access and change information related to a data object, tracked at a discovery point granularity. A change catalog tracks who, how, when, and where aspects of a data object being accessed and/or modified. There is one change catalog for every discovery point.

Remote Site: one or more off-site nodes in communication with local site primary or intelligence nodes.

Pool: the collection of data storage connected to a node.

Object: a file, directory, share, volume, region within a volume, or an embedded object.

Objects can be complex, containing other embedded objects. For example, a file can be a container containing other files, or a volume can have a file system on top of it which in turn contains files. The system is capable of recognizing complex objects and tracking changes at finer embedded object granularity.

Selective Restore: an automatic (policy based) or manual (customer initiated) restore at an object level.

Site Restore: a manually initiated process to recreate primary or intelligence pool content using a previously protected version of the data being restored.

Container: objects which may have other embedded objects, such as a file, directory, file system, or volume.

Expansion Nodes: appliance having a processor, memory (RAM), network connectivity, and storage devices, and connected to one or more primary or intelligence nodes scaling the processing power and/or storage for connected nodes.

Operation

In the following detailed description, reference is made to the accompanying drawings which form a part hereof, and in which are shown, by way of illustration, specific embodiments in which the invention may be practiced. It is to be understood that other embodiments may be used, and structural changes may be made without departing from the scope of the present invention as defined by the claims.

The disclosed high availability (HA) storage system provides primary storage, analytics, and Live Restore functions. Live restore is a technique used to optimize data restoration. It can be used to recover user data in case of a failure or to recover previous versions of the user data. The system provides primary storage access as block and/or file level storage while avoiding single points of failure. The system collects analytics in real-time while also protecting data in real-time on separate physical media, and includes options for off-site data protection. The system implements deep analytics enabling restore, storage, and data intelligence, and protects both customer data and associated analytics. The system provides traditional file based and custom API methods for extracting analytics metadata. The system employs Live Restore techniques at a file and at a block level to recover in case of a failure or to recover a previous version of user data. This provides for near-instantaneous restore at the object level, and significantly reduces wait-before-access time in case of primary or intelligence node complete failure (e.g., a full site restore). A file or block level Live Restore uses previously gathered analytics to prioritize data to be restored, while allowing user I/O access to the data during restoration.

Referring to FIG. 1, Primary Node 100 of the system connects within a network to provide block and/or file level storage access to connected computing devices (not shown), real-time data protection, and real-time analytics of primary data. Primary data is read from and written to primary storage pool 110. The data can be written or read as files or blocks depending on the access protocol being used. As the data is written it is automatically mirrored and tracked for data protection as part of a HA process for the primary node. The mirrored cache of the data is created for Intelligence Node 120. The Intelligence Node enables data protection, analytics, and recovery. The Intelligence Node stores a real-time copy of primary data, analytics and discovery points within intelligence pool 130. Discovery points are automatically or manually created at any point by the Intelligence Node, and based on fine grained change data enabling action to be taken immediately with no need to copy the underlying primary data or do any post processing to determine what has changed since any prior discovery point.

In a preferred embodiment, each Node is capable as acting as either a Primary Node, an Intelligence Node, or both. For reliability and performance reasons, separate Primary and Intelligence Nodes are desirable. In case of failure of either node, the other may take over operation of both. Implementation without dual-capability (that is, operating solely a Primary Node and solely an Intelligence Node) is possible but loss of service (to either primary or intelligence storage) would occur on failure of such a node. In a preferred embodiment, each one of the Nodes has a processor and local memory for storing and executing Node software, a connection to physical storage media, and one or more network connections including at least a dedicated high bandwidth and low latency communication path to other Nodes.

Figure 2:
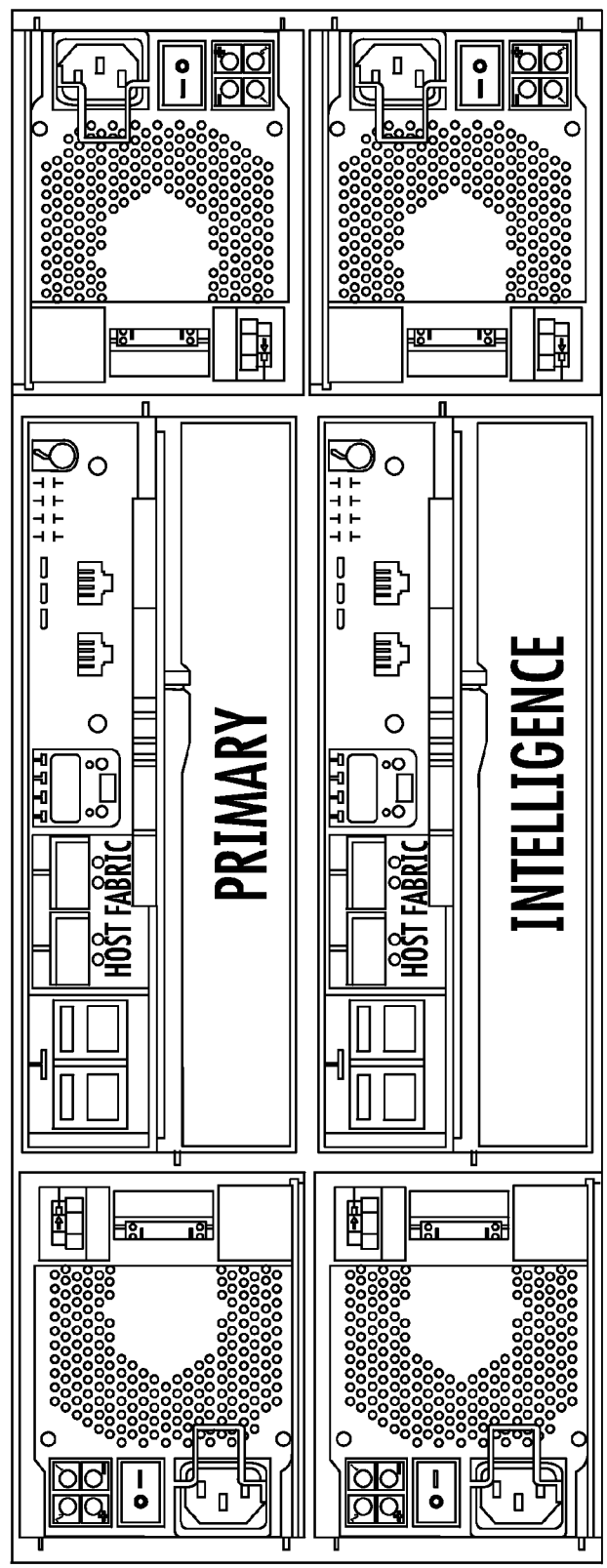
FIG. 2 is a view of an appliance device containing Primary and Intelligence Nodes.

In a preferred embodiment, the Primary Node and Intelligence Node are physically housed within a single device, creating a user impression of a single appliance. FIG. 2 shows one such example, with Primary Node 100 and Intelligence Node 120 housed together to appear as a single physical appliance. Implementation may be with any number of disks, for example such as a four rack units (4U) housing containing up to twenty-four hard drives, with separate physical storage devices connected to the system. Internally each node is completely separated from the other with the exception of a backplane, with each node having a dedicated (not shared) power supply, processor, memory, network connection, operating media and optionally non-volatile memory. Separation enables continued operation, for example the Intelligence Node may continue operating should the Primary Node fail, and vice versa, but shared resource implementation is also possible.

Primary Node

Figure 3:
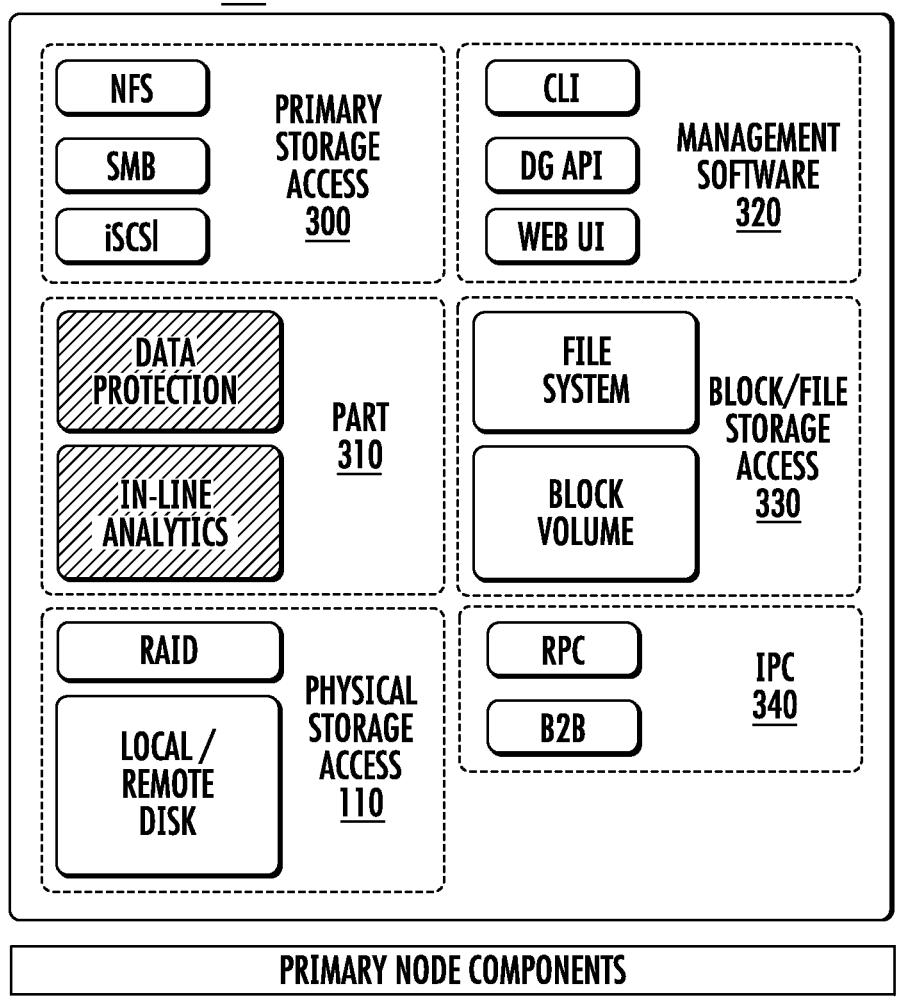
FIG. 3 is a diagram showing the components of a Primary Node.

Also referring to FIG. 3, a node actively operating as Primary Node 100 operates storage protocol server software 300, for example Common Internet File System (CIFS), Network File System (NFS), Server Message Block (SMB), or Internet Small Computer System Interface (iSCSI), so the Primary Node will appear as primary storage to network-connected computer devices. The storage protocol server software also communicates with a protection and analytics in real-time process (PART) 310 which intercepts and takes action on every data access.

The PART 310 performs three main roles after intercepting any data access request: mirroring primary data for HA, gathering in-line data analytics on primary data, and storing primary data. The examples explained herein are directed to a file access perspective, but the PART can similarly process block level accesses. When performing block access to a volume, the PART can identify embedded objects and perform the same analysis that is applied to file-level accesses. Intercepted access requests include read, modify (write data or alter attributes, such as renaming, moving, or changing permissions), create, and delete. The PART tracks and mirrors the request (and data) to the Intelligence Node. Communication with the Intelligence Node is through synchronous or asynchronous inter-process communication (IPC) 340 depending on configuration. IPC may including any suitable protocols or connections, such as Remote Procedure Call (RPC) or a Board-to-Board (B2B) high performance, low latency communication path that may be hardware specific. Any data included with a data access request, such as included in write operations, is also mirrored to the Intelligence Node as part of HA system operation. This mirroring establishes data protection through real-time redundancy of primary storage. Additionally, the PART executes in-line analysis of primary data, gathering real-time analytics. The PART sends gathered real-time analytics to the Intelligence Node, where the analytics are added to a change catalog maintained by the Intelligence Node. In addition to analytics, the PART directs the request to an actual file system, for example Fourth Extended File System (EXT4) or Z File System (ZFS), or block volume for file or block storage access 330 to physical storage devices.

The storage access function 330 (be it file system level or block level) performs the access request on storage media, and returns the result to the PART for return to the requesting system. In a preferred embodiment, the storage media includes disks attached to the system, but other storage media solutions are possible.

In a preferred embodiment, the Primary Node also includes the software necessary to operate as an Intelligence Node in case of Intelligence Node failure.

In a preferred embodiment, the Primary Node also operates management software. Preferably accessed through a browser interface (although any user interface provision method may be used), the management software provides system administrators access to configure and manage system users and access discovery points for the restore process.

Intelligence Node

Figure 4:
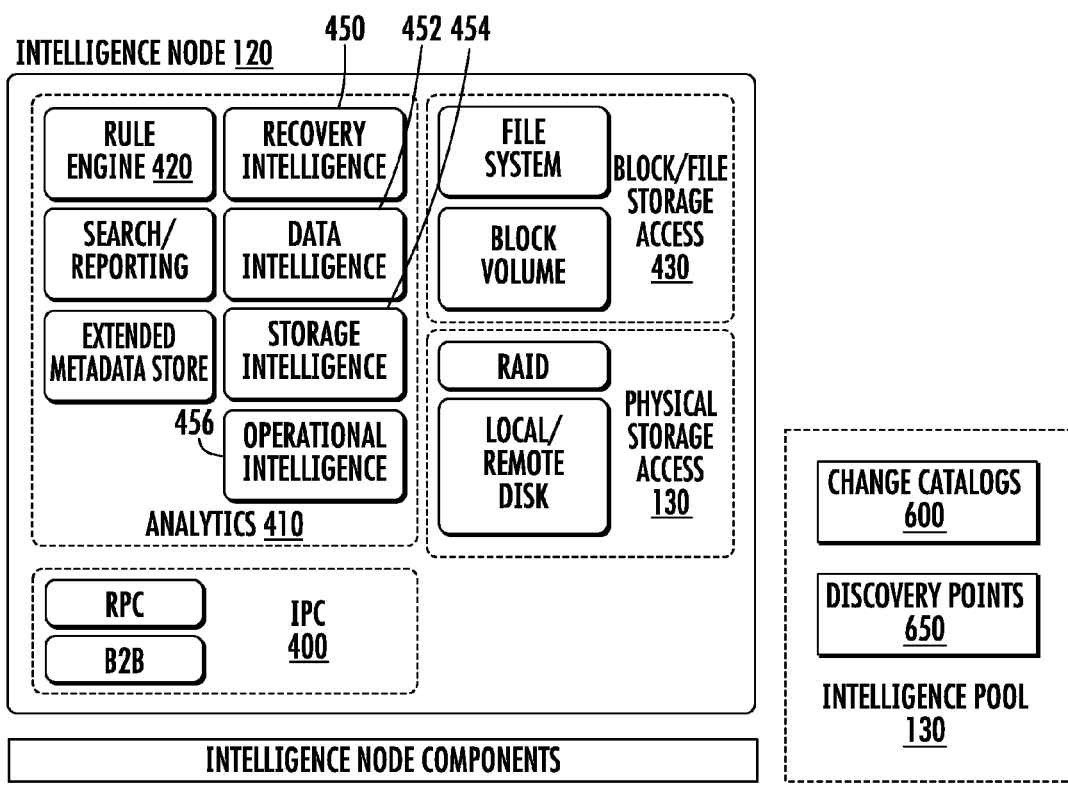
FIG. 4 is a diagram showing the components of an Intelligence Node.

Referring also to FIG. 4, a node actively operating as Intelligence Node 120 operates Inter Process Communication (IPC) communication software 400 capable of communicating with the Primary Node. The communication software includes an API to receive real time analytics (change catalog entries) from the Primary Node, data change and access requests (read, modify, create, delete) from the Primary Node, data protection and intelligence control commands, and data restore commands. Data protection and intelligence control commands include commands for creating discovery points, setting up management rules for managing discovery points (including deletion), and searching and restoring content that has been backed up. Data restore commands include commands for accessing previously backed up data.

Data change requests that are received at the Intelligence Node are applied to that node's copy of current data, thereby maintaining a real-time mirror of primary storage. This implements real-time data protection for the current data.

For data analytics and data recovery purposes, the Intelligence Node maintains a change catalog 600 containing real-time analytics gathered from accessed and changed data since the last discovery point 650. A discovery point is also created by associating and storing a change catalog together with reference to the mirrored copy of changed primary data since the last discovery point as maintained in the intelligence pool. A more detailed discussion of the change catalogs and discovery points is provided below.

The Intelligence Node implements file or block-level access 430 to its own pool 130 of physical storage. This intelligence storage pool retains the real-time copy of primary data and discovery points. The stored intelligence data within discovery points includes in-line analytics (change catalog) as received from the Primary Node and additional analytics 410 executed by the Intelligence Node.

The real-time copy of primary data also enables distributed response processing between the Primary and Intelligence Nodes. For example, load balancing between the Primary and Intelligence Nodes may enable greater scalability. As both have real-time copies of primary data, read requests may be balanced between the nodes, or alternatively directed to both nodes with the fastest-to-respond used for the response. The Primary Node may act as a controller for such distributed processing, or a separate controller may be used.

There is no requirement that the Primary 110 and Intelligence Data 130 reside on the same appliance, they can be distributed to multiple discrete appliances deploying all the same techniques with the exception that the communication method is performed over a network transport instead of using the HA mechanisms within an array.

Analytics

Intelligence is at the core of the system. There are four types of intelligence functions in the system: Data, Operational, Storage, and Recovery. All four use the same processing engine and common analytics metadata to provide analysis both at fixed points and as gathered over time. Data Intelligence 452 allows for intelligent user content management. Operational Intelligence 456 analyzes the behavior of the system and application logs stored on the system to provide insight into applications and security of the system. Storage Intelligence 454 allows for intelligent storage system resource management, including automatic storage allocation and reallocation including dynamically growing and shrinking storage pools. Recovery Intelligence 450 allows for intelligent data protection and data restore. All types of intelligence may be used for, or enable operation in conjunction with, different types of analytics, such as, but not limited to, collaboration, trending, e-discovery, audits, scoring, and similarity.

Analytics begin at the Primary Node, which tracks data access and data modifications, system behavior, change rates, and other real-time analytics. It provides this real-time analytics information to the Intelligence Node. Intelligence gathering determines time and owner relationships with the data for collaboration and contextual information about the data. The gathered intelligence is used for later search and reporting, and is tracked in change catalogs associated with the data.

Figure 5:
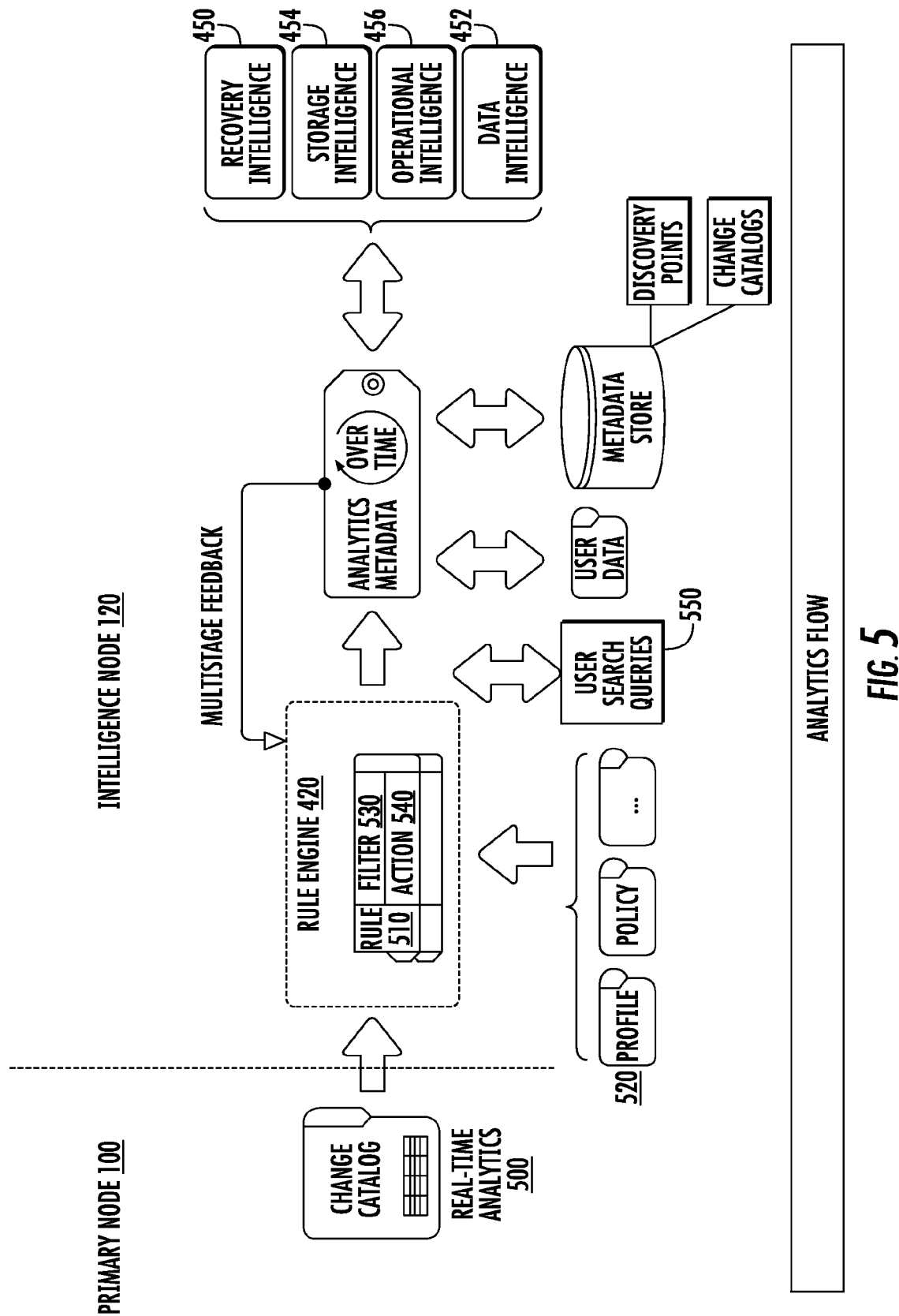
FIG. 5 is a diagram showing the analytics flow process.

Referring now to FIG. 5 and to FIG. 6A, change catalogs 600 are created as part of in-line real-time analytics 500 performed by the Primary Node 100, but change catalogs 600 are then also further expanded by the Intelligence Node 120 performing further data processing, and create the foundation for later search. The change catalog data is initially created in real-time at the Primary Node (such as via PART 310) and includes extended information about the specific data access, for example, allowing complete tracking of who/how/when/where accessed, created, modified, or deleted a file or other data object. Traditional file metadata includes only an owner, group, path, access rights, file size, and last modified timestamp. This provides some, but not complete, information about a file. For example, it does not identify who modified the file, how many modifications have occurred, or any information about file accesses (such as viewing or reading a file) which do not modify the file. The PART, operated by the Primary Node, intercepts every file access event. Thus the Primary Node has the ability to track extended metadata about a file—including identification of every modification and every access, even those which do not modify the file, by timestamp, user, and type of access.

Figure 6A:
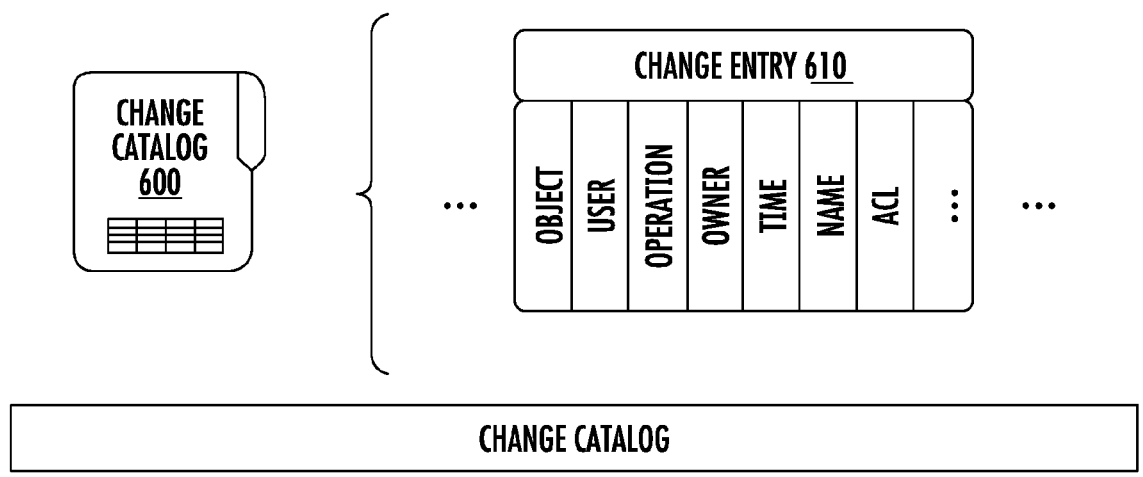
FIG. 6A is a diagram showing the structure of a change catalog.

Referring also to FIG. 6A, this extended metadata is stored as a change catalog entry 610 that identifies the object being accessed, the actor (user performing an operation), and the operation being performed. Additional information which may be in a change catalog entry includes, but is not limited to, object name, owner, access control lists, and time of operation. The change catalog 600 contains this extended metadata information, and serves as the foundation of further analytics, such as performed later by the Intelligence Node. The change catalog entry may also include security information, such as permission rights for access, associated with the object. An administrator may configure the degree of tracking, or even enable/disable tracking on a file location, user, group-specific, or other basis, and the Primary Node is capable of incorporating all details of every file access into the change catalog entries. These change catalog entries of enhanced metadata are gathered by the Primary Node and transmitted to the Intelligence Node for storing and expanding with further analytics.

Figure 6B:
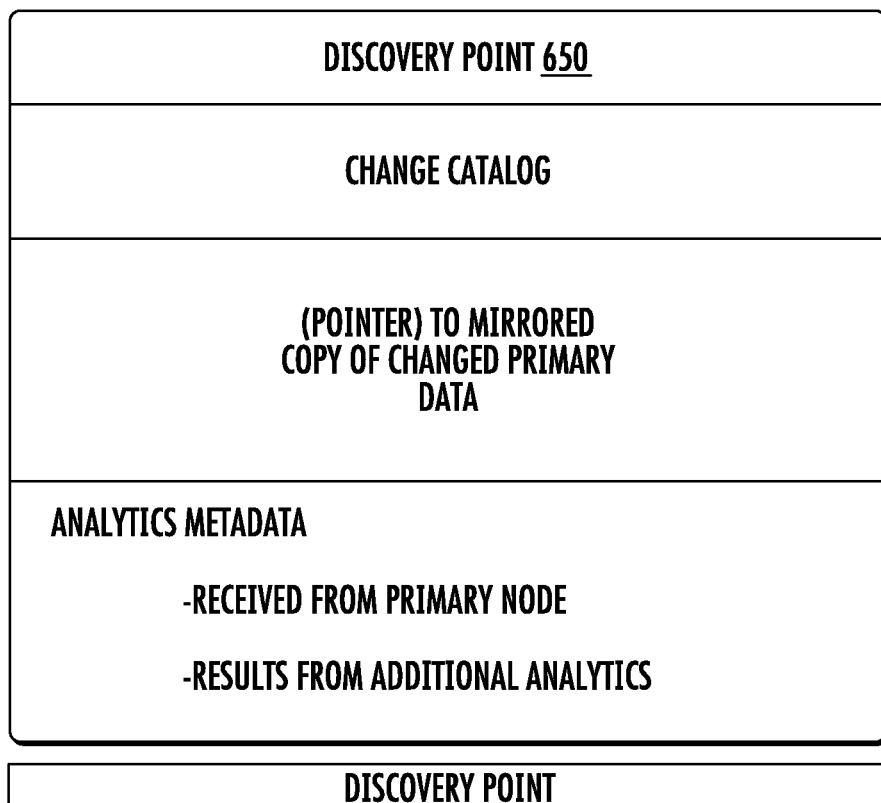
FIG. 6B shows a discovery point.

With reference now also to FIG. 6B, the change catalog metadata tracks incremental changes which are also linked to a discovery point 650. Every time a new discovery point is created the current change catalog is closed off and stored within the discovery point. When data is retained in the discovery point, the system may be configured to retain a copy of the discovery point analytics metadata at the Intelligence Node even if that discovery point is migrated off the Intelligence Node, enabling more efficient query processing.

A discovery point 650 is created by associating and storing a change catalog together with the mirrored copy of changed primary data since the last discovery point in the intelligence pool. After a discovery point creation, a new change catalog 600 is created allowing gathering of new real-time analytics on primary data. Change catalogs and discovery points are preferably maintained per volume or file system in primary storage, but may also span multiple volumes or file systems. Discovery points allow deeper analytics on a point in time version of primary data, and can also be used to recover a prior version of primary data. A discovery point contains data analytics for accessed and changed data since a prior discovery point. When created, a discovery point also contains a virtually full but physically sparse copy of primary data at the time of creation of that discovery point. The system uses data visible within discovery points to perform deeper data processing, creating more analytics metadata. The analysis is done on accessed and changed data since a previous discovery point, using the real-time analytics reflected in the change catalog. These newly gathered deeper analytics are also stored within the discovery point. Primary data may be retained for the life of the discovery point, or may be removed earlier, such as after the deep data analysis is complete and desired analytics metadata obtained. Removing the primary data allows for more efficient space utilization, while retaining the primary data enables recovery of primary data at the point in time of the creation of the discovery point. From one discovery point until the creation of a next discovery point, file changes, deletions, renames, creations and such are tracked as cumulative modifications to from the prior discovery point, so that only incremental changes are maintained. This creates a version of the data at each discovery point. While the data is retained in a discovery point, the system is able to restore data at the discovery point granularity. As change catalogs are stored with each discovery point, information about change history between discovery points may be available through analysis of the change catalog. To restore a data object at a particular point in time, a discovery point is used. For long-term storage, discovery points may be moved to long-term media such as tape or off-site storage as configured through the management software.

Discovery points can be deleted manually through a delete discovery point command, or automatically based on time or analysis in order to save storage space or for off-site migration. Deletion of discovery points is complicated by management of analytics metadata. The analytics metadata stored within a discovery point contains information about data changed within a period of time. If the stored analytics are deleted they can be lost. To prevent this, the time period for analytics associated with one or more other discovery points can be adjusted, and relevant portions of analytics metadata from a discovery point being deleted extracted and merged with other analytics already stored within the other discovery points.

Returning attention now to FIG. 5, at the Intelligence Node, an adaptive parallel processing engine, or Rule Engine 420, operates on the change catalog 600 to derive these more complex analytics, including tracking changes and use over time. The Rule Engine applies rules 510 to analyze content on the underlying primary data, enabling deeper analytics on stored data. As an example, a second level dictionary can provide sentiment attributes to an already indexed document. Regular expression processing may be applied to see if a document contains information such as social security or credit card numbers. Each rule may have a filter 530 to match content, and an action 540 to take based on results. Rules can be nested, and used to answer user-specific questions. Another example may be to apply locations where keywords appear, for example to search objects for a set of keywords such as "mold" or "water damage," and in all matches to search the objects for address or zip code information. Rules are configurable by administrators or system users, allowing dynamic rule creation and combination based on different applicable policies 520. Rules can be combined in multiple ways to discover more complex information. Rules may also be configured for actions based on results. For example, notifications may be set to trigger based on detected access or content, and different retention policies may be applied based on content or access patterns or other tracked metadata. Other actions may include, but are not limited to, data retention, quarantine, data extraction, deletion, and data distribution. Results of applied rules may be indexed or tracked for future analysis.

As applied rules 510 identify results, such results may be indexed or tracked for other analytical use. This additional metadata may be added to the change catalogs for the relevant files or objects. The metadata may also be tracked as custom tags added to objects. Tags may be stored as extended attributes of files, or metadata tracked in a separate analytics index such as data in a directory or volume hidden from normal end user view, or in other data stores for analytics. Rules, and therefore analytics, may be applied both to data tracked and to the metadata generated by analytics. This enables analytics of both content and gathered intelligence, allowing point-in-time and over-time analysis. The rules results and actions may serve as feedback from one or more rules to one or more other rules (or even self-feedback to the same rule), enabling multi-stage analysis and workflow processing.

Recovery Intelligence 450

Recovery Intelligence is the set of analytics implemented by Intelligence Node 120 around data protection. The purpose is to protect data and associated analytics. When data reaches the Intelligence Node a mirrored copy is stored in the intelligence pool, creating redundancy with primary storage, and these changes are tracked for use in discovery point creation. Primary data, discovery points, and intelligence data are preferably separated on actual physical media at the spindle or disk pool level, such that a failure of a single individual physical device is always recoverable. As discovery points are created based on change catalogs tracked at the Intelligence Node, they can be created at any time without any impact on the performance of primary storage. This eliminates a need to schedule time-windows for discovery point creation. Each discovery point includes incremental changes from the prior discovery point, including data object changes and the analytics gathered and associated with the data during such changes. Intelligent rules can be applied to automate discovery point creation, such that, in addition to manual or time-based creation, discovery point creation may be triggered by content changes. Such changes may be percentage based, specific to percentage change of certain identifiable subsets of the entire data pool, based on detected deviations from usage patterns such as increase in frequency of specific accesses, or based on real-time analysis of data content.

At the creation of a discovery point, the change catalog accumulating real-time changes is closed. The change catalog is then stored within the created discovery point, and a new change catalog created for changes to be associated with a next created discovery point. The analytics and data stored within discovery points enable efficient restores, allowing search over multiple discovery points for specific object changes without requiring restoration of the data objects from each discovery point. Such search can be based on any analytics performed, such as data tracked in the extended metadata and content-based analysis performed by application of the Rule Engine. The tracking further enables indexing and partial restores—for example specific objects, or embedded objects within complex objects, can be restored from a discovery point without a complete restore of all data from that discovery point.

Data Intelligence 452

Data Intelligence is a set of analytics at the Intelligence Node analyzing content. Data Intelligence operates through the Rule Engine, and can be applied to unstructured data, for example file metadata such as document properties of Microsoft Office documents or the actual content of such documents, semi-structured data such as log files or specific applications such as Mail programs, structured data such as databases or other formats for which schema may be known or discovered by the system, and recursive containers such as virtual machines, file systems on file systems, file systems on volumes, or archives.

Storage Intelligence 454

Figure 7:
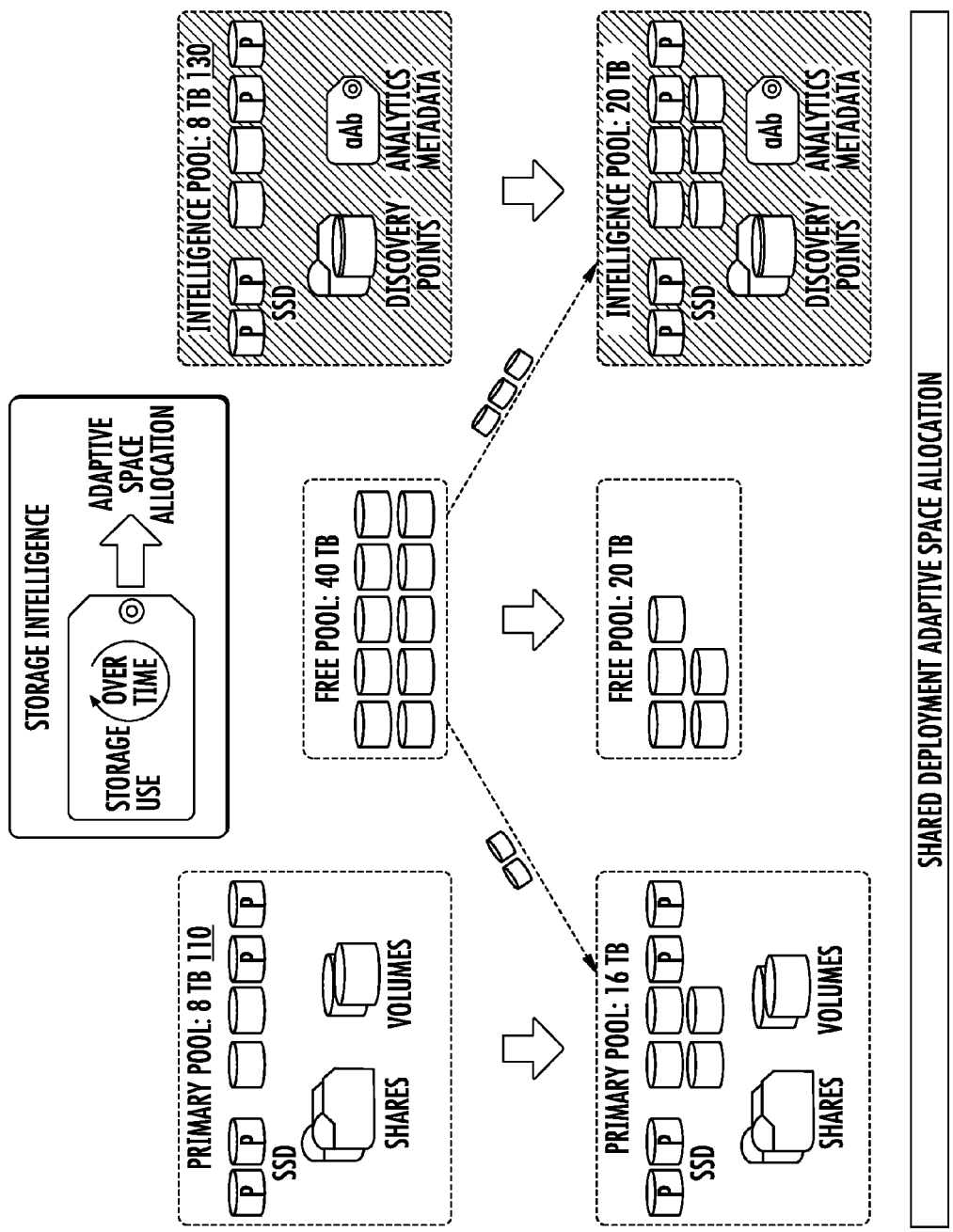
FIG. 7 is a diagram showing adaptive allocation of available storage.

Storage Intelligence is a set of analytics performed by the Intelligence Node analyzing the entire system. Storage Intelligence operates through the Rule Engine to track total storage and system use over time to both predict usage patterns and analyze capacity needs. Referring also to FIG. 7, available physical storage can be dynamically adjusted, such as the allocation of physical devices between primary storage 110 and intelligence data storage 130, maximizing use of the system before expansion is required. The example shown in FIG. 7 illustrates allocating a portion of unused storage between a primary pool and an intelligence pool. Similarly, space can be reclaimed from assigned pools when no longer needed. For example, in reverse of the shown example, excess storage assigned but not used by the primary pool can be identified and dynamically removed from the primary pool to a spare pool or directly reallocated to an intelligence pool. This dynamic allocation and reallocation occurs without degrading storage availability. Dynamic reallocation may move data within portions of a data pool to ensure such degradation does not occur. The same dynamic allocation may also be applied when expansions are added, enabling intelligent maximization to storage resources to continue after expansion. Storage Intelligence may be applied to improve resource usage efficiency, such as identifying processing demands, patterns of system usage, and scheduling flexible high demand processes during periods of low usage. For example, some Rule Engine analytics can be batched to run periodically, and dynamically scheduled based on predicted system use.

Operational Intelligence 456

Operational Intelligence is done by integrating the application logs stored in primary storage and determining usage patterns, errors, and/or anomalies in the logs. Operational Intelligence also monitors access patterns for the data and alerts designated administrators on inconsistent behavior such as possible signs of security issues.

Intelligence Searching

With only the inline analytics, real-time searching is enabled for immediate results such as: who, when, or who and when, was a specific file accessed; which files were accessed by specific users; are access patterns consistent with appropriate file access rights; or which files were modified (or viewed) within a certain time period. If additional in-line or secondary analytics are enabled, the intelligence is expandable to include content-specific search. Searches are performed by users submitting user search queries 550 to the system, but also taking security into account. There are at least two levels of access provided: super user (administrator) and individual user. Super users and individual users are authenticated (for example using Active Directory or a local user database). Individual users are able only to see the results that they are authorized at the time of the search. Individual user rights may be configured by authorized administrators, or default to match existing user rights. For example, access to analytics for search purpose may be restricted by default to analytics associated with data objects the user has or had permission to access in primary data. This preserves permissions and data security of intelligence data which matches the permissions and security for primary data without requiring manual account configuration of manual access permission configuration of intelligence data. Super users are able to see all results.

Data Protection

Figure 8:
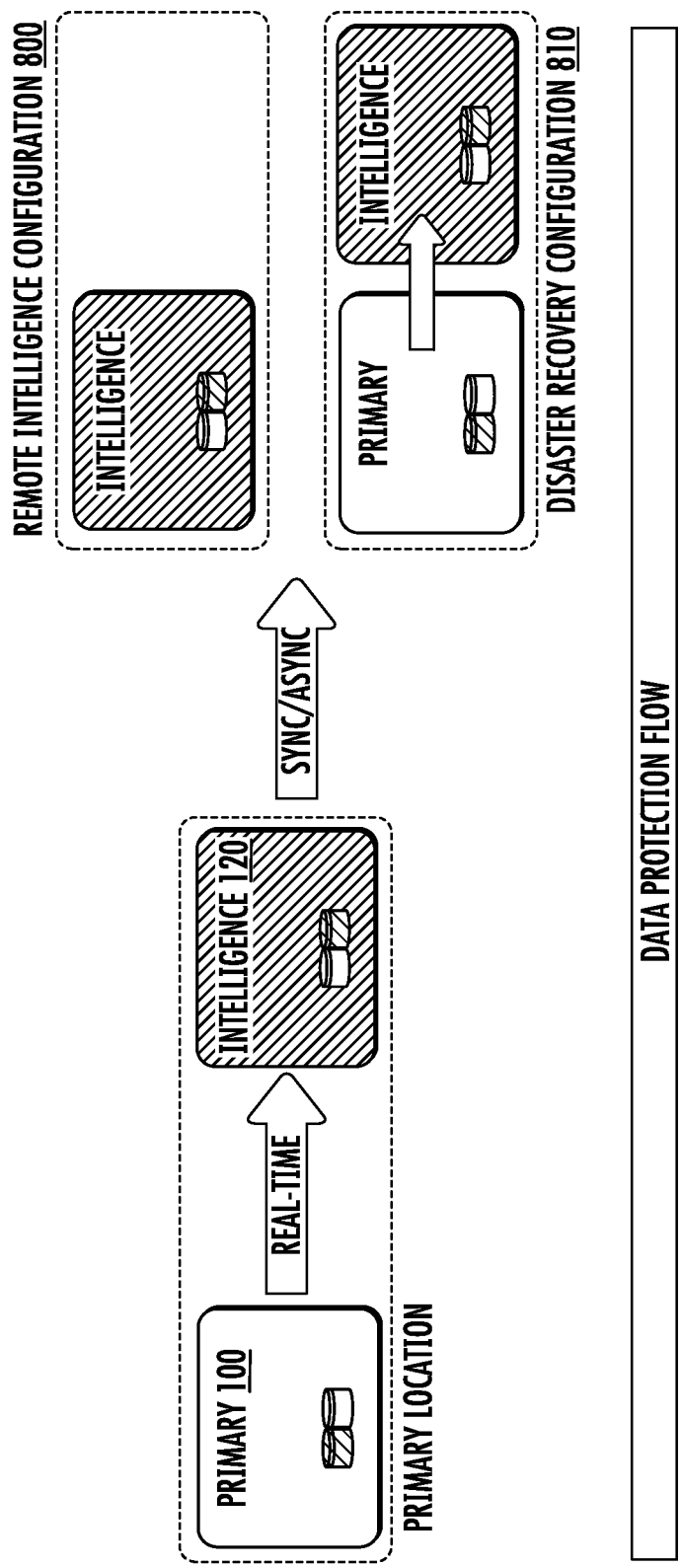
FIG. 8 is a diagram showing data protection flow from a Primary Node to an Intelligence Node to a Remote Site.

Referring also to FIG. 8, data protection flows between different nodes. Customers create data accessing Primary Node 100. Intelligence Node 120 protects customer data stored on Primary Node 100 by storing a mirrored copy of primary data within the intelligence pool 130. Previous versions of primary data can be retained within discovery points that are stored in the intelligence pool, further enhancing primary data protection. Each discovery point may include a crash consistent snapshot in time of customer data. Discovery points are created based on policies 520 associated with primary storage (file systems or volumes). Policies use fixed values (i.e. time passed or data change percentage) or previously gathered analytics as the main triggers for creating discovery points. If a Remote Site is connected, data may further flow from the Intelligence Node to the Remote Site, configured either for remote intelligence 800 or complete disaster recovery 810.

Primary and Intelligence Nodes can be deployed in an independent deployment or a shared deployment configuration, and both configurations can additionally be configured to communicate with a Remote Site. For both configurations users are presented with a single system management view.

Figure 9:
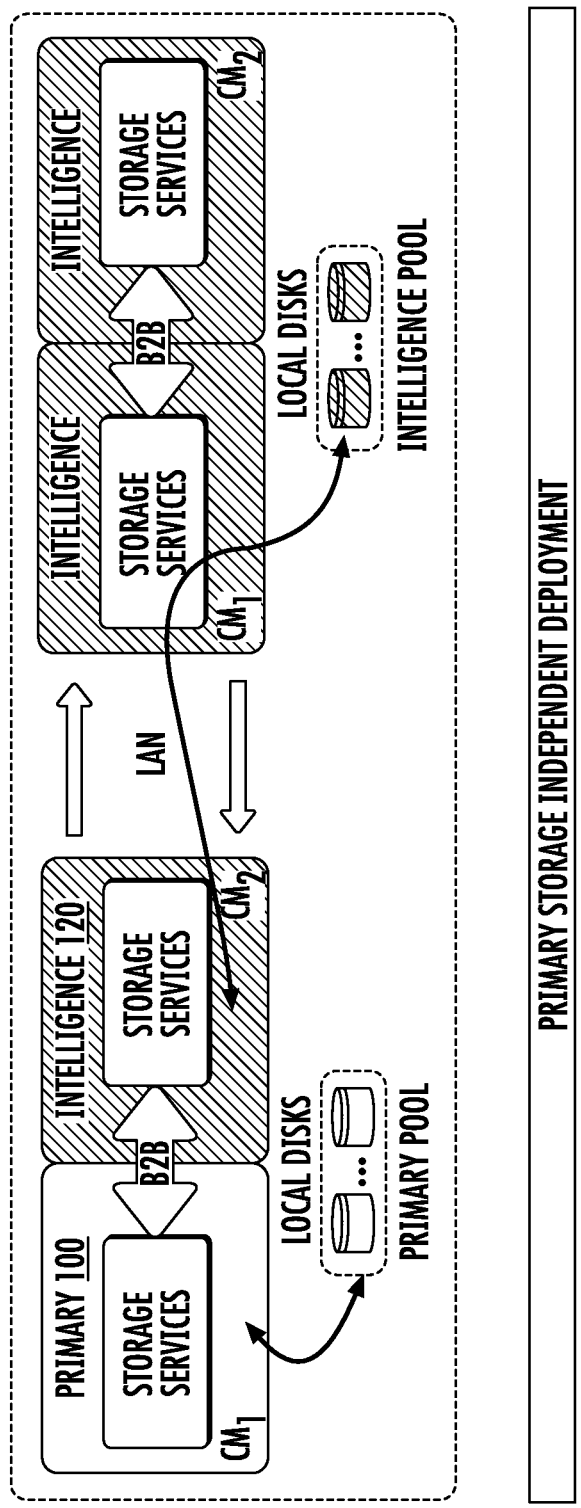
FIG. 9 is a diagram showing a Primary Node and an Intelligence Node in an independent deployment.
Figure 10:
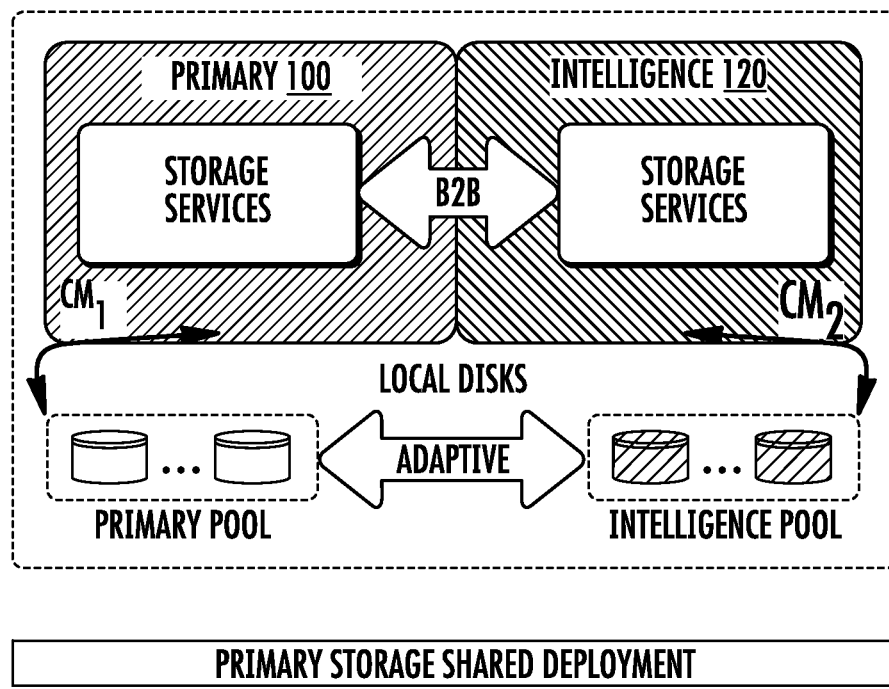
FIG. 10 is a diagram showing a Primary Node and an Intelligence Node in a shared deployment.

Referring also to FIG. 9, in an independent deployment Primary Node 100 and Intelligence Node 120 operate as independent separate appliances, with the Primary Node executing access requests to primary data independent of communications with the Intelligence Node. Referring also to FIG. 10, in the preferred shared deployment Primary Node 100 and Intelligence Node 120 are installed to be accessed and managed by users as if a single physical appliance, with the Primary Node confirming communications with the Intelligence Node on all data access requests. For both shared and independent deployments, in the case of failure of one of the nodes, the other node can continue to operate acting as both primary and intelligence nodes. When shared deployment is used the data protection from Primary to Intelligence Nodes is continuous; there is no data loss in the event of a Primary Node failure (full Node, or primary data pool) as HA stream data is delivered to the Intelligence Node in real time. When independent deployment is used the data protection from Primary to Intelligence Nodes may be real-time as in a shared configuration or alternatively near-continuous. In the near-continuous case, the HA stream data delivery to the Intelligence Node is delayed. This introduces a potential for some data loss in case of Primary Node failure (full Node, or primary data pool), but network latency has minimal impact on the primary IO path performance. When independent deployment employs delayed data protection, change catalog entries are transferred in real time from Primary to Intelligence Nodes, but the mirror of primary data is delivered asynchronously creating the possibility of data loss. The change catalogs can be used to identify what changes were lost in the event of failure, by identifying received change catalog entries with no corresponding receipt of primary data. Nodes deployed at a remote site can add an additional level of data protection, and communicate with the Intelligence Node. Remote Site deployment options are discussed below under Off-Site Data Protection, although they may also be deployed on-site as additional redundant protection.

Data Restore

Figure 11:
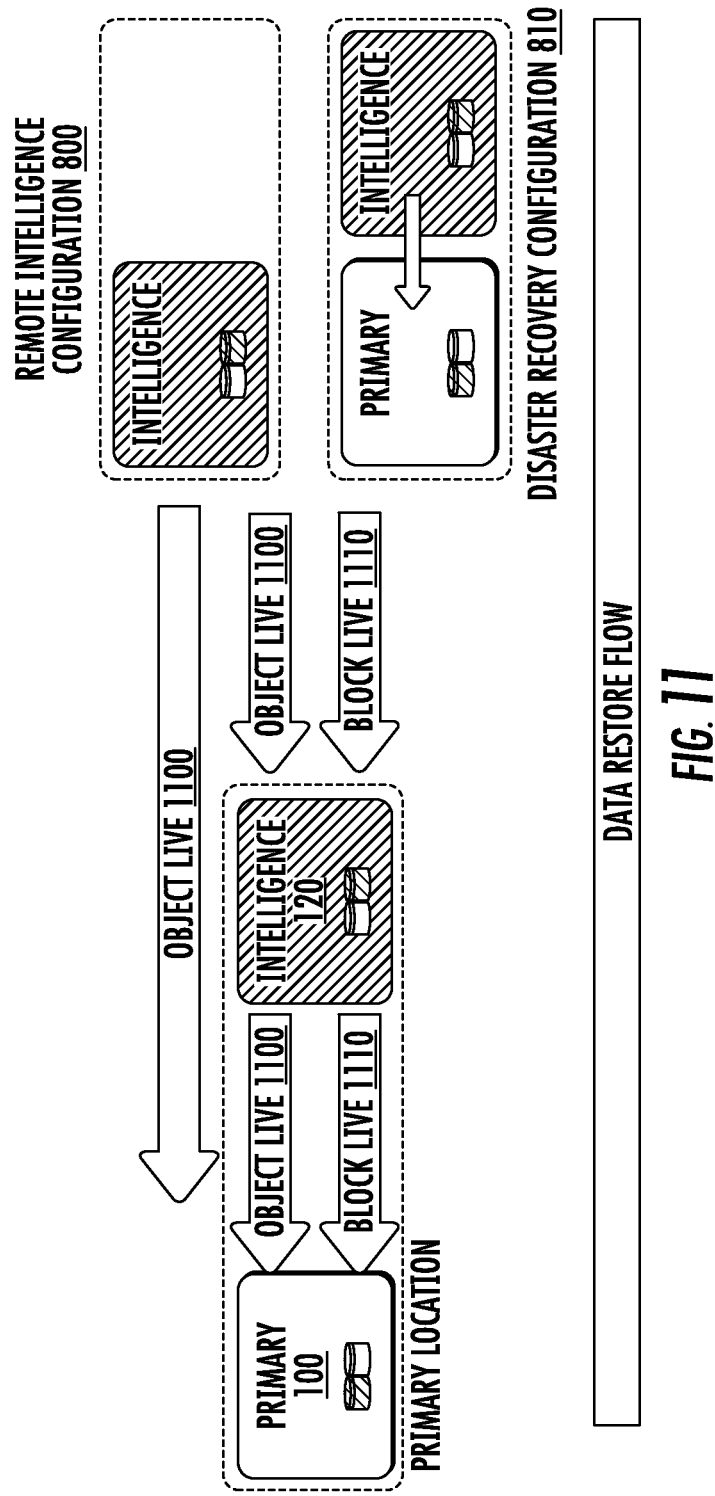
FIG. 11 is a diagram showing data restore flow from an Intelligence Node or Remote Site to a Primary Node, and from a Remote Site to an Intelligence Node.

Referring also to FIG. 11, data flows in the reverse direction during a restore process. Data restore may be selective (object-level) or full site. The restore is live, providing near instantaneous access to object level restored data, and significantly reduced wait time to access data from a full site restore when compared to traditional restore systems. The restore is fully protected, as any changes to restored data are tracked in real-time, even if the restore process is still on-going.

Current primary data is always protected by storing a mirrored copy of primary data in the intelligence pool 130. If primary data is retained in discovery points, users can restore previous versions of their data. Users use selective restores to restore data at file, directory or file system granularity using Object Live Restore 1100 either from Intelligence Node 120 to Primary Node 100, from Remote Site to Primary Node 100 in a remote intelligence configuration 800 or disaster recovery configuration 810, or from Remote Site to Intelligence Node 120 in either a remote intelligence configuration 800 or disaster recovery configuration 810. Full site restores utilize Block Live Restore 1110 to restore primary data from an Intelligence Node 120 to a Primary Node 100 or to restore both primary and intelligence data from a Remote Site in a disaster recovery configuration 810. A full site restore is most commonly needed in the event of a complete data pool failure. For restore flow consideration, current data (or current as of the selected discovery point to restore) is restored to the Primary Node, and discovery points (that include analytics metadata and primary data) are restored to the Intelligence node.

To perform a selective restore at an object level, a user selects a source discovery point 650 for the data restore. Selection may be direct if the specific discovery point is known, or based on results of a search on the analytics metadata associated with each discovery point. The searchable tags, content, classifications, etc. provide search access to, among other options, file type, file application metadata (for example document author), owner, analytics assigned tags (for example for files containing social security numbers), content search keywords, etc. Once the discovery point is chosen, a restore process starts. Data can be restored into the original container, overwriting the current version in primary storage, or into a different container thereby creating a separate copy.

Figure 12:
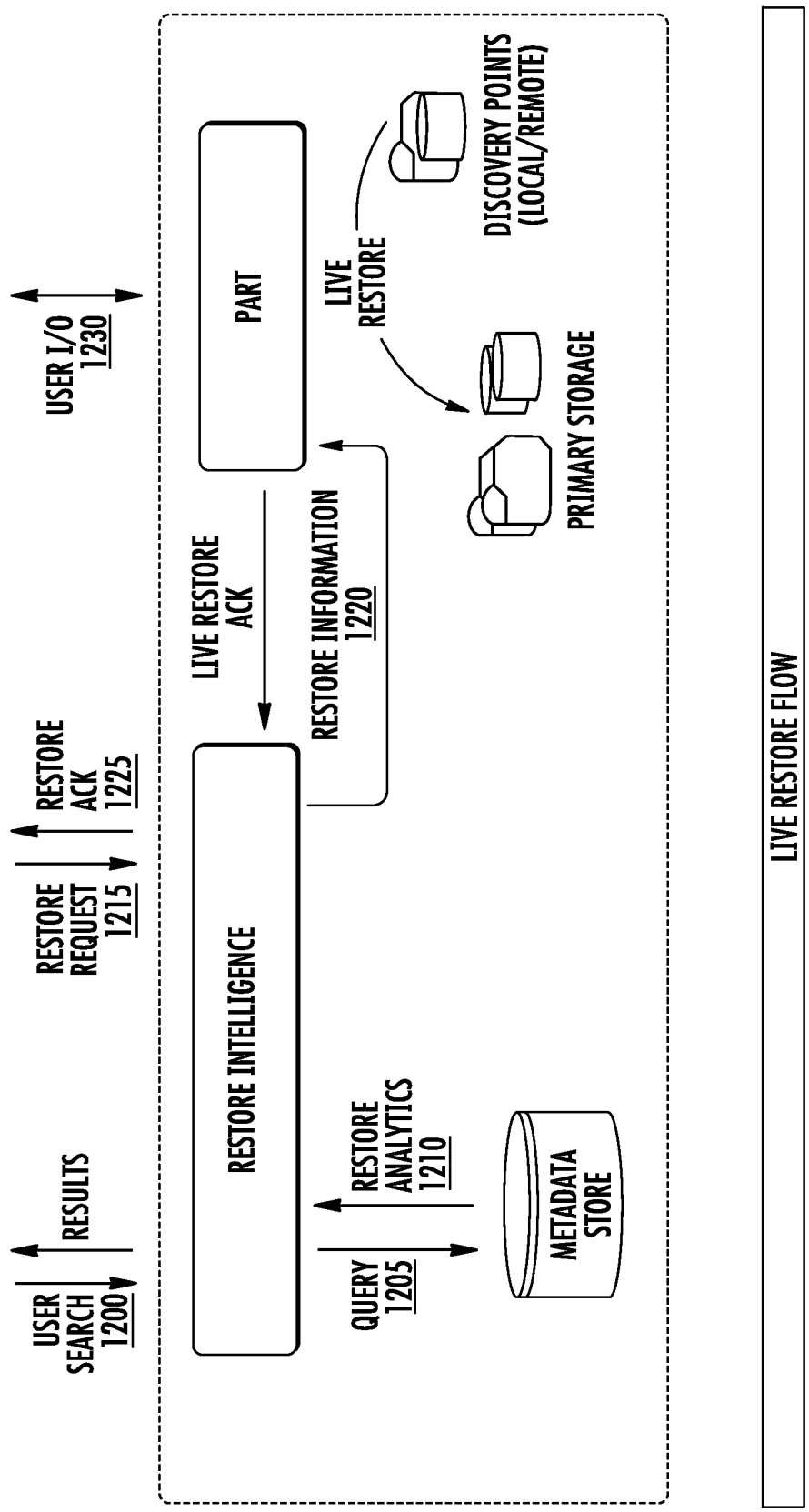
FIG. 12 is a diagram showing process flow for data restore.

The Object Live restore process, which operates to enable selective restore, is a core mechanism providing for rapid data restore at an object granularity. Users experience near-instantaneous access to the data when such restore is performed. To accomplish this, the node controlling the destination for the restore creates empty containers for what is being restored based on the metadata. Any actively requested portions are immediately sourced by requesting those specific portions from the restoring node. This creates immediately available data for end users. Any additional data needed to complete the restore is transferred with a priority assigned based on previously gathered over-time analytics. Such live restore and access is enabled by operation of PART intercepting all file access requests, enabling identification and prioritization of hot regions needing immediate restoration. Similarly, accesses and modifications to the restored file are tracked even while the background restore is ongoing, as these accesses are also intercepted by PART. Thus selective restore allows immediate access to restored objects and also real-time protection of any changes, even before the objects have been completely restored. Referring also to FIG. 12, with selective object restores the restore process appears complete to system users almost immediately after the restore request is made. Users search 1200 intelligence data, which internally queries 1205 metadata for restore analytics 1210, for a desired discovery point. Once identified, the user may initiate 1215 a restore request. The restore request, optionally along with related analytics metadata, is directed 1220 to the PART. The PART begins the restore by extracting metadata relevant to the restore from the discovery point. The file metadata includes file name, path, size, owner, group, and access rights information for each file, and specific to any point in time. With the metadata restored, the PART may provide file identification information, such as directory listings, without the actual restored data moving to primary storage. This allows acknowledgement 1225 to the user that the restore is complete, and operation 1230 of user input/output with the restored data, even before complete restore of the actual data. Actual restore of the data may be prioritized based on specific file access. For example, if specific file data not yet restored is accessed, that file may be prioritized for immediate restore. When no priority restores are occurring, general data restore of the entire data content may continue. In this fashion, users experience and may access immediate results from restore requests, even if the complete data restore requires a significant time period (such as minutes or hours).

A full site restore is used for bare-metal recovery, restoring chosen volumes and/or file systems, and associated discovery points and analytics data in bulk. With any full site restore the associated analytics metadata is also restored. There are two types of full site restores. A complete site restore restores both primary and intelligence data from a remote site. A primary-only site restore restores primary data from an Intelligence Node. To perform a full site restore, users identify one or more volumes and/or file systems and discovery point through direct selection or search and selection. Once file systems and associated discovery points are selected, the restore process starts. With a complete site restore, the version of the selected volumes and/or file systems in the selected discovery point are restored to Primary and Intelligence Nodes, and discovery points are restored to the Intelligence Node. With a primary-only site restore, the selected volumes and/or file systems in the selected discovery point are restored to the Primary Node. Additionally with a primary-only site restore, discovery points may be selected/de-selected for retention, with the Intelligence Node retaining all discovery points selected for retention and deleting the others.

The Block Live restore process, which enables full site restore, is a core mechanism that provides for rapid data restore at site granularity. Users experience dramatically reduced wait time before data is accessible after initiating a full site restore. As an initial step, metadata is copied, at a block storage level, for the volumes and/or file systems being restored. This copying creates the main delay time before data is accessible. The metadata identifies all objects being restored, both primary data and any discovery points. Once the metadata is restored, virtual containers can be created for all data entities being restored. At this point the primary data may be made available for user I/O access and normal operation. Actively accessed files or extents (regions) within volumes are immediately sourced and restored as block-level restores, creating priority restoration for actively accessed data. The remainder of the site data is restored as a background process using priorities based on previously gathered over-time analytics. As with selective restores, all accesses and modifications are tracked enabling real-time protection even while the background restore is ongoing. Such near-immediate access and real-time protection is enabled by PART intercepting all data access requests. Based on metadata, PART can identify if access requests are to already restored data, in which case operation continues as normal, or not-yet-restored data, in which case appropriate data blocks are identified for priority immediate restore.

System Management

A management service allows creating and modifying user rights, node and physical storage management, data intelligence configuration, manually creating and managing discovery points or scheduling options for automatic discovery point management, and provides access to the restore process. Different management software implementations are possible, but a preferred method is implementation of management software 320 as a management server within the Primary Node. The management server delivers user management through a browser-based interface to authorized administrators.

The management service allows management of discovery points. Discovery points may be manually created, scheduled for automatic creation based on time periods, or configured for dynamic automatic creation based on previously gathered over-time analytics. Archiving or migration to remote sites may also be triggered manually or scheduled for automatic occurrence based on time periods, or configured for dynamic automatic occurrence based on previously gathered over-time analytics.

The management service allows configuring the rule engine for data analytics. Such rules may be applied to all new data changes, or also run on all data already stored in a Intelligence Node. Rule priority may be set such that critical analysis is applied in-line at the Intelligence Node to make important analytics instantly available with all data, while less critical analysis may be batched and run periodically at lower priority.

In addition to a custom API available via traditional programming languages, the system supports a file access based interface allowing query creation, execution, control, and extraction of results through the standard file system API. Query execution files can be stored as special files in pre-identified locations. Such files may include information on queries to be performed, when to perform, resources to use to perform, where to place or store results, and what formats should be used to present the results (for example, raw data, pdf, a specific report format, etc.). When a query is being executed by the system, a progress folder may contain files with names and content that can be used to monitor progress. Users may write custom scripts and tools to create, schedule, monitor, and extract results using such standard file system operations.

Off-Site Data Protection

The Intelligence Node provides local protection to the primary data and analytics metadata. An optional remote system may provide further redundancy as well as an option for geographically remote protection of the primary data and analytics metadata.

In this discussion of such a solution, a primary location is considered to comprise Primary and Intelligence Nodes as described earlier, and the Intelligence Node communicates with a Remote Site system.

As with discovery points, with remote protection analytics metadata is associated and transferred with the actual data (both for protection and restore). Remote Sites may be configured to receive and store mirrors of Intelligence Node, thereby providing geographically separate redundancy, or as an archival option. Data changes (a delta of data and analytics) are sent from the Intelligence Node to the Remote Site, enabling a redundant copy of primary storage and current analytics, with options to configure different rules for discovery point creation enabling different archival options at the Remote Site. For archival purposes, rules may be configured such that the local Intelligence Node retains discovery points within a specified time period and frequency, and the Remote Site contains a different set, such as spanning a longer time period and/or lower frequency. For example, the Intelligence Node may be configured to retain hourly discovery points for the past thirty days, while the Remote Site may be configured to retain daily discovery points for the past two years. Global analytics are available across the data for the entire time period based on the metadata retained at both nodes. Remote Site rules may further be configured at different levels, such as at the system or user share or internal file system levels, allowing different degrees and duration of protection within a larger data set.

Such off-site data protection provides two possible solutions: Disaster Recovery (DR) and Remote Intelligence. Both solutions provide protection of customer data and analytics metadata in case of a full primary location failure (both Primary and Intelligence failure on the primary location). The Primary to Intelligence to Remote Site data flow extends data protection to an additional level.

Remote Intelligence

As shown in FIG. 1, when operating normally with a Remote Intelligence configuration, the local site Intelligence Node replicates data and analytics metadata to Remote Site Intelligence Node 140. The Remote Intelligence Node may be configured to receive discovery point data and analytics replicated from the Intelligence Node, such as discovery points about to be aged off (deleted from) the Intelligence node, or to receive copies of live change data and create the discovery points and related analytics directly at the Remote Intelligence Node. Discovery points on the Remote Intelligence Node may be aged out (deleted) and analytics metadata pruned based on configured policies operated by the Rule Engine of the Remote Intelligence Node.

Data replication to a Remote Site may be done synchronously or asynchronously. In the synchronous case, data is replicated in real-time and the Remote Site contains a complete and up-to date copy of primary storage data. The advantage of such synchronous method is that no data is lost in case of a complete failure (both primary and intelligence) at the local site. However, local site performance can be significantly reduced because data must be replicated to the Remote Site before a storage operation is acknowledged as completed.

The asynchronous case avoids the risk of performance impact on primary storage. Data replication may be delayed, in which case the Remote Site contains a version of primary storage data, but not up-to-date in real time. This avoids any performance impact, but introduces a risk of some data loss in case of complete failure of the local site (both Primary and Intelligence Node failure).

Object Live Restores can be performed for any discovery points on the local or remote Intelligence Nodes. To an end user perspective, there is no distinction in recovery data between a local or remote Intelligence Node—all discovery points on both Intelligence Nodes are searchable and available for use in recovery through management interfaces provides by the Primary Node.

In case of a complete local site system failure, the local site may be restored from the Remote Site, allowing full operation as part of a full site restore process. Prior to restoration of the local site, users can perform searches using the analytics metadata available at the Remote Intelligence Node. Users may have read-only access to data stored within each discovery point on the Remote Intelligence Node, or read-write access to their data stored within each discovery point, depending upon policy configuration. However, in the read-write case newly modified data might be not protected. Based on the chosen policy and Remote Intelligence Node system capabilities, no, limited, or complete analytics may be produced on the newly modified data. In one example, only a change catalog is maintained for the newly modified data and no queries could be performed on the newly modified data. In another example, full analytics metadata is produced but possible with much less performance. For full operation utilizing the remote site after a local site failure, the disaster recovery configuration is preferred.

Detailed Discussion of Live Restore Techniques

The following sections describe the various Live Restore methods and apparatus in more detail. As mentioned above, the processes are different depending on the context of the Live Restore context being at an Object Level (file, directory, or file system level), or Site Level (using block operations).

Object Level Live Restore

An Object Level live restore process and apparatus provides a mechanism to selectively restore Files, Directories, or individual File Systems. A Single File Live Restore is the core mechanism for all such Object Level live restores.

Traditional file systems have an identifier that is used to uniquely identify a file or a directory efficiently. In discussion below we use the term "ObjectId" to represent a file system identifier that uniquely identifies a file or directory within a file system. Inode number is an example of an ObjectId that is used in Portable Operating System Interface (POSIX)-compatible file systems. There is a typically an invalid ObjectId that does not represent a valid file or a directory. We will also use the abbreviation "OID" for ObjectId.

Single File Live Restore

Figure 13:
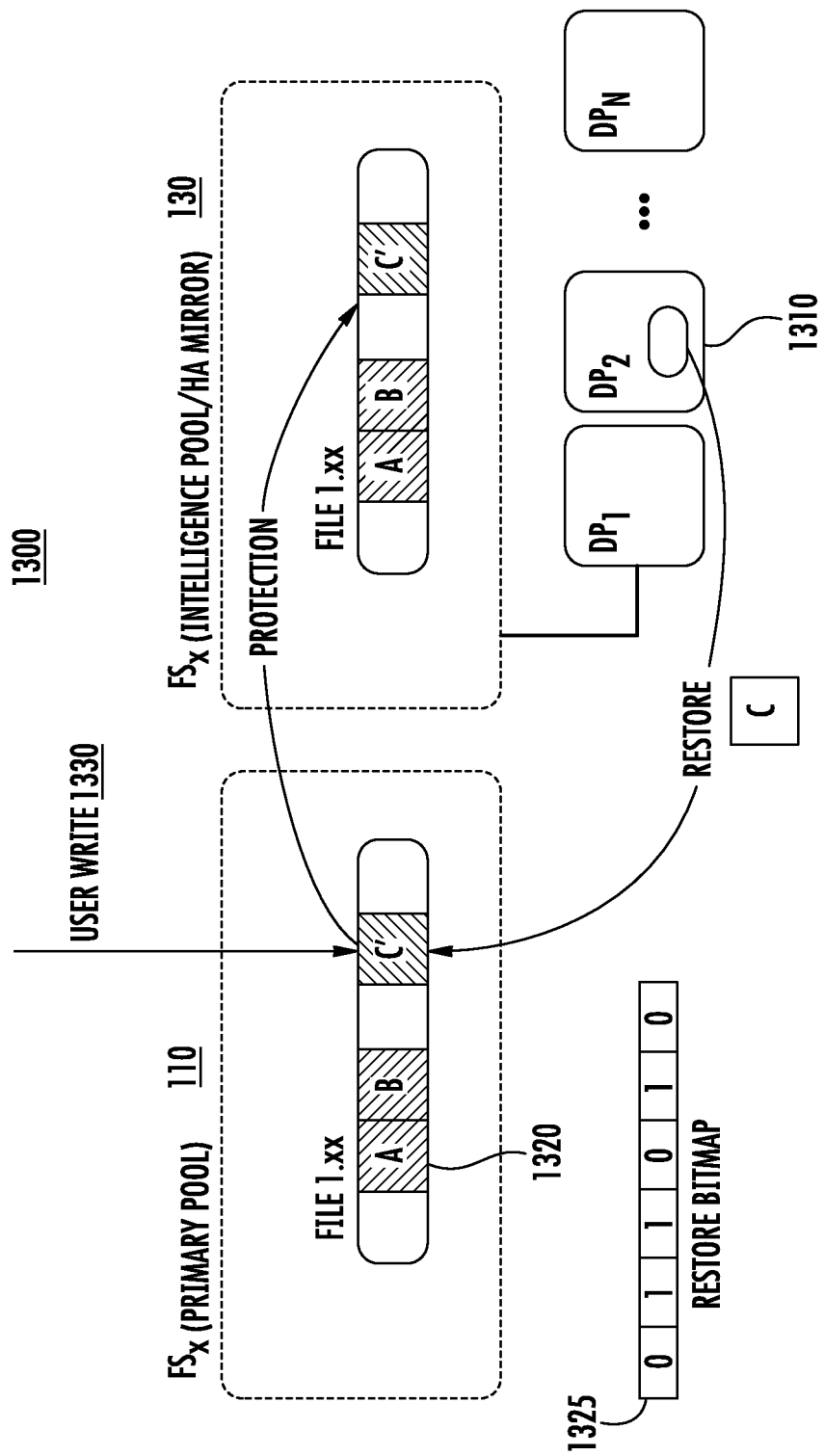
FIG. 13 shows a File Level Live Restore process for restoring a single object while a user WRITE is in progress.

FIG. 13 shows a File level Live Restore process 1300 used for restoring a single file.

A version of file named "file1.xx" 1305 is being restored to a primary pool 110 from the intelligence pool 130. The version is identified by file path and a "discovery point" 1310. As explained above, a discovery point 1310 contains a point in time copy of the data and previously gathered analytics. During the process of live restore, in one implementation, the file is divided into equal size chunks called blocks 1320. A file is restored block by block atomically. The size of the block does not change during data restore. The state of blocks during live restore in this implementation are managed using a restore bitmap 1325. For each block in the source file a bit in the bitmap buffer tracks whether a block has been restored. For example, a bit with a value of 1 marks a block that has been restored, while a bit with value of 0 marks a block that needs to be restored. In FIG. 13, Blocks A and B have already been restored using a schedule based on previously gathered analytics, as stored in the source discovery point. Here, Block C is currently being modified by a user I/O operation 1330. Block C is restored, then data is merged with the users data, resulting in data C' which is then stored within both the primary and HA copy. As file blocks are restored a Restore Bitmap is updated to reflect the state of a restore.

In other implementations, the blocks 1320 may be of varying length. In such an implementation, a list of ranges (extents) that have been restored can be maintained. The ranges can be specified with a starting and ending offset, or in other ways.

In case of a Primary Pool 110 failure, no user data is lost since the Intelligence pool 130 contains enough information to recover the user data.

In case of an Intelligence Pool failure, the Primary pool contains the new user data. If a remote/disaster recovery copy of the intelligence data is available, then the data within the Primary pool and the recovery copy of the intelligence data can be used to completely recover the user data.

The following algorithm (reproduced as FIG. 14) is one way to implement the general steps involved in a single file restore (continue to refer to FIG. 13). Here, a file version of a file to be restored is identified by a tuple S_Path and S_DP, where S_Path is a file path within discovery point S_DP. D_Path identifies the destination where the source version is to be restored.

---
Algorithm FileRestore(IN S_Path, IN S_DP, IN D_Path)
---

1. Prepare file for restore.
   a. Call algorithm PrepareFileForRestore to create an empty destination file D_Path and mark appropriate metadata allowing for the Live Restore to be executed
   b. (as described below in more detail)
2. Allow I/O access to the file before restore is complete
   a. Call algorithm IoToFileBeingRestored to permit user access to data being restored
   b. (as described below in more detail)
3. Start background restore of data
   a. File data is restored as a background process
   b. Restore I/O is performed at a block by block level within the file
   c. For each block restored, the restore map records restored blocks
      i. In one implementation, the restore bitmap is a bitmap stored within an extended attribute of a file, where each bit represents a block ---
-continued Algorithm FileRestore(IN S_Path, IN S_DP, IN D_Path)
--- d. Background data restore uses two principles to prioritize restore of the blocks
      i. Blocks being actively restored in real-time
      ii. Previously gathered analytics stored in the S_DP at the sub-object and block level
         1. An example of a sub-object could be a jpeg image within a power point presentation that was accessed more frequently and would be restored with a higher priority
         2. An example of a block could be Master file table for NTFS file system stored within a virtual disk file or an iSCSI LUN that is accessed very early in a boot process and restored with higher priority
   4. As new data is being written to the file being actively restored
      a. mirror the new and restored data providing for HA; so that new data is also protected real-time with the standard HA techniques as described elsewhere.

Restore Bitmap

The restore bitmap is used to allow random I/O access to the file while it is being restored. There are quite a few ways that one can maintain this bitmap. For example a bitmap can be maintained in NVRAM for the entire duration of the restore operation. The bitmap can also be maintained in a private extended attribute. Since the size of NVRAM is limited, the first approach limits the number of files that can be actively restored and maximum size of the file being restored. The extended attribute approach could be extended to support any size of the file by using hierarchical bitmaps (similar to b-trees).

Each bit in the bitmap tracks the restore state for a region that is restored atomically. A bit with value of 0 marks a region that needs to be restored, while a bit with a value of 1 marks a region that has been restored. A zero bitmap (all bits are zero) is created initially indicating that no regions have been restored. As live restore continues and individual regions are restored, the bitmap is updated to reflect the state of restore for each region. Typically this would be at least of native file system block size, but can be multiples of it. A bit to bitmap can also be dynamic from file to file based on the size of the file being restored to limit the bitmap size. For example for smaller files, a bit might represent a region that is aligned with native file system block, for larger files it could be multiples of native file system blocks

Restoring Multiple Files

A typical system should allow many files to be restored in parallel; indeed it should accommodate the possibility that multiple files and multiple directories may be requested for restore by many users at the same time. For all restores, the system uses a "RestoreLink Files" approach as discussed below. The system can employ a background process that scans and/or monitors the RestoreLink directory for the creation of new RestoreLink files. When a new restore is added, the background process detects the new file. Previously gathered analytics, as stored in the Source discovery point, can dictate the prioritization and schedule of a large number of files to be restored. The total number of files subject to the restoration process can be much more than can be maintained in the memory. Such as system would need a schema that allows scheduling a restore of large number of objects with an ability to switch between them in real time when the set of objects to be restored cannot be maintained in memory (RAM or NVRAM).

RestoreLink Files

In a preferred embodiment, the Live Restore requirement is implemented using a RestoreLink Files approach. However, other approaches are possible.

In this approach, each primary file system maintains a RestoreLink directory that contains RestoreLink Files. The RestoreLink directory is hidden from users and not accessible by them. A RestoreLink File is created in the RestoreLink directory for each file to be restored. The system employs a background process that scans/monitors the RestoreLink directory. This background process is responsible for detecting new RestoreLink files and prioritizing a restore based on previously gathered analytics.

The main advantage of the RestoreLink files approach is that it allows finding files to be restored without the need to scan the file system namespace which would otherwise be very expensive. A traditional file system directory scanning technique on the hidden directory containing RestoreLink files can be used to continue the restoration process on a system failure or determining next file to be restored and determining that all files have been restored. A background process can also monitor the content of this directory triggering active restores on files. A system can further utilize analytics to prioritize which files to be restored first when performing a scan on the RestoreLink directory.

A RestoreLink File contains a RestoreSource, RestoreSize, FileOID and Restore Bitmap as follows:

RestoreSource=<DPsource, OIDsource>; where
    DPsource identifies a discovery point containing the file to be used as the source for the restored file, as identified further by OIDsource. RestoreSource thus uniquely identifies the source object for the restore operation.

RestoreSize is a numerical value that records the source file size, or in other words size of the data to be restored FileOID is an object identifier of the file being restored (OID of the destination)

Restore Bitmap used to track progress of the restore operation.

These values could be stored as attributes on the file or data within the RestoreLink file. In this discussion we assume that all values are stored as data within the RestoreLink file.

Each file to be restored also contains a RestoreLinkOID attribute that contains the OID of the corresponding RestoreLink file. This is a private attribute that is not visible to the users. This attribute is removed or invalidated once live restore completes. This allows efficient access to the RestoreLink file when an I/O to a file being restored is performed.

RestoreLink files are named using the OID of the file to be restored. In the preferred embodiment a name is created as a concatenation of "RL_" prefix and a textual representation of OID of the file being restored.

The following algorithm (also shown in FIG. 15) is used to prepare a file for restore. It returns the OID of the new file created that will be live restored in FileOID parameter.

---

Algorithm PrepareFileForRestore(IN RestorePath, IN RestoreSource=<DPsource, OIDsource>, OUT FileOID)

---

1. Obtain size to be restored from RestoreSource
2. Create a new file RestorePath that will be the destination for the restore, and obtain its object id, returned in FileOID
3. Restore metadata on the file being restored (permissions, ownership, attributes, etc) from the RestoreSource
4. Create a RestoreLink file with its object id RestoreLinkOid and name "RL_<FileOID>"

---

-continued

Algorithm PrepareFileForRestore(IN RestorePath, IN RestoreSource=<DPsource, OIDsource>, OUT FileOID)

---

5. Save RestoreSource, restore size, FileOID and an zero restore bitmap in the newly created RestoreLink file
6. Save RestoreLink file OID in the RestoreLinkOid attribute on the file to be restore

---

Figure 16:
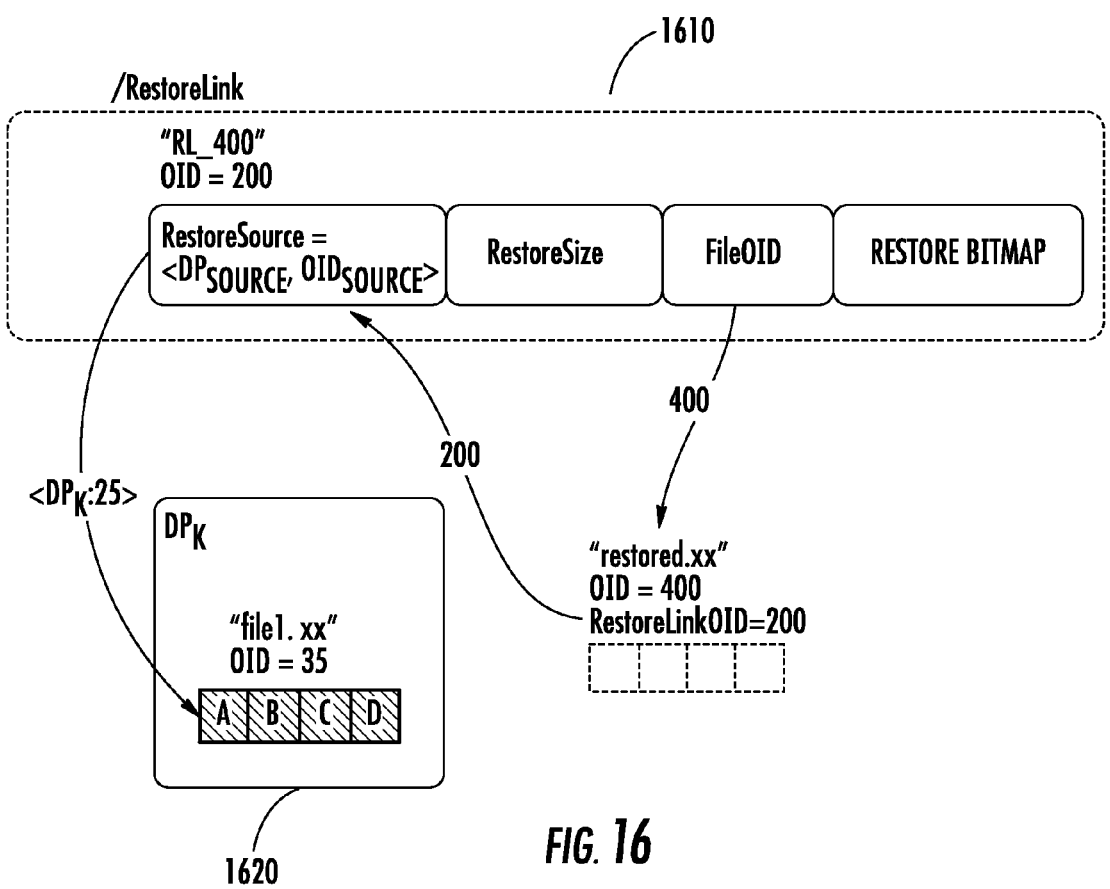
FIG. 16 is an example of a file prepared for live restore.

FIG. 16 shows an example of a file prepared for a restore. A "RestoreLink" directory 1610 contains a RestoreLink file "RL_400" having OID 200 that points to the restore source file "file1.xx" having OID 35 stored within discovery point K 1620 having OID 25. It also points to the file to be restored via OID 400, identifying file "restored.xx". File "restored.xx" points back to the restore link file "RL_400" with OID 200 via the RestoreLinkOID attribute.

I/O to a File being Restored

At run-time the system uses caching techniques to optimize access to the information about restores. This can include OIDs for files being restored, associated Restore bitmaps and RestoreLink files information. The system can also employ NVRAM or traditional Journaling techniques to allow for atomic modification of the information needed while performing operations atomically that involve multiple objects (files), i.e. restore bitmap, live restoring the data and allowing user I/O while file data is being restored. These guarantee consistency of file system data and metadata and simplify the recovery in case of errors.

We assume here that the region in the user I/O perfectly aligns with the restore block identified by a single bit—in other words, we assume that the I/O is fully contained within a restored block. If it is not, a variety of standard techniques could be used. For example one can split a user I/O into multiple operations each of which is contained with the restore block size.

The following algorithm (as depicted in FIG. 17) is used to perform I/O to a file (identified by FIleOID) that is being restored. The arguments are as follows:

FileOID identifies the file to which user performs I/O
IO_Region identifies I/O operation region
IO_Type identifies Read or Write operation
R_State is a portion of a restore bitmap that is used to identify the restore state of the I/O region. This state is obtained from the corresponding RestoreLink file.

---

Algorithm IoToFileBeingRestored(IN FileOID, IN IO_Region, IN R_State, IN IO_Type: Read/Write)

---

1. Determine the restore state of the block from R_State
2. If the region has not been restored, restore the block that overlaps with the user I/O
   a. Read data out of the source file and write it to the destination - the primary and HA mirrored copy
   b. Update the restore bitmap in corresponding RestoreLink file marking a region restore completion
   c. If all blocks are restored complete the restoration process
      i. delete RestoreLink File
      ii. Mark file restoration being done by deleting or invalidating RestoteLinkOID
3. Proceed as a normal user I/O
   a. In case of a READ, obtain the data and return to the user
   b. In case of a WRITE update primary and HA mirror copy of the data

---

The following algorithm is used to perform an I/O to a file (identified by FileOID).

If a file is not being live restored, the system performs file system I/O as explained in connection with the earlier drawings. That is, in case of a READ, the system reads the data from the primary source and returns it to the user; in case of a WRITE, the system writes data to the primary and HA copy. However, this process changes when a live restore attribute is valid, as follows:

---

Algorithm File_I/O(IN FileOID, IN IO_Region,
IN IO_Type: Read/Write)

1. Obtain RestoreLinkOID attribute from FileOID
2. Check if file FileOID is being live restored
    a. If RestoreLinkOID is not present or invalid, proceed as a normal IO
        i. In case of a READ, obtain the data and return to the user
        ii. In case of a WRITE update primary and HA mirror copy of the data
3. If RestoreLinkOID is valid, obtain the restore state R_State for the IO region
    a. Load a portion of bitmap from the corresponding RestoreLink File (identified by RestoreLinkOID). As each bit represents a region that was or needs to be restored, the system can quickly determine the set of bits needed
4. Call IoToFileBeingRestored(FileOID, IO_Region, R_State, IO_Type)

---

Directory/File Restore

Directory and File System live restore processes can use the individual file restore process described above.

A File System level live restore can be treated as a restore of its root directory.

A directory can contain many files and other sub-directories with more files. A simple approach to implementing a directory restore can be locking the directory tree to be restored and then performing live restore of individual files.

While live restore for a single file is almost instantaneous, the main problem with a locking destination directory tree approach is that a source directory may contain many sub-directories and files leading to lengthy cumulative live restore process. This might be undesirable as the access to the destination directory is blocked while this process takes places. One effect of this that user I/O would timeout and applications that rely on these I/Os would stop operating properly. We describe a process that does not require locking of the entire destination directory tree for the entire duration while preparing files for restore. When restoring a directory tree, the destination must not exist or must be empty.

A typical file system has a deterministic way of traversing content of a directory. The content of each source directory (including its sub-directories) is fixed for the duration of the operation and can be traversed in a well-defined order. For sake of the discussion, we can make a parallel with a tree traversal. Each directory could be treated as a node of a tree and each file could be treated as a data content. The directory being restored can be described as a multi-branch tree. The restore source directory is traversed using the traditional tree depth-first order approach: sub-directories are visited first and then each file in the current directory is live restored. While performing the traversal the system keeps track on the path it is currently traversing. The main advantage of using the depth-first approach is that the path information is bounded and small. For example, LINUX OS limits file path to 4 KiB independently how many sub-directories appear on this path.

The algorithms below use the following inputs: RestoreSourceDp, RestoreSourceDir, and RestorePathDir.

RestoreSourceDp is the discovery point containing data to be restored (source of the restore data)

RestoreSourceDir is the directory in the RestoreSourceDp that is being restored. As before with the files, the tuple <RestoreSourceDp, RestoreSourceDir> forms a version of directory to be restored.

RestorePathDir is the path into which data is restored (destination directory).

While restoring a directory, the system keeps a private (not visible to the users) attribute called RestoreInProgress on each directory being restored. This attribute records the source information for the live restore <RestoreSourceDp, RestoreSourceDir>. Presence of this attribute indicates that this directory file content live restore has not completed. An absence of this attribute indicates that all files in the directory have been completely restored or live restored (metadata completed and data is being restored) or this is a directory that did not need restoration (this could happen when a directory is deleted and the created with the same name). This attribute is used primarily to coordinate incoming namespace operations while directory live restore is in progress. If a directory was deleted and re-created it does not have this attribute present.

The following algorithm is used to initiate background traversal of the directory being restored and then initiating live restore of each individual file. This algorithm (as depicted in FIG. 18) is executed by the system in background. Each sub-directory is accessed by its name and not by its OID.

---

Algorithm DirectoryLiveRestore (IN RestoreSourceDp,
IN RestoreSourceDir, IN RestorePathDir)

1. For each sub-directory S in RestoreSourceDir
    a. Atomically create sub-directory S in the RestorePathDir:
        i. Create S
        ii. Restore metadata of S from the source <RestoreSourceDp, RestoreSourceDir>
        iii. Record an attribute RestoreInProgress on S
    b. Call DirectoryLiveRestore(RestoreSourceDp, complete path for S in RestoreSourceDir, complete path for S in RestorePathDir)
2. Call DirectoryContentLiveRestore(RestoreSourceDp, RestoreSourceDir, RestorePathDir)

---

The system allows namespace operations on the directories being live restored. User access to the directories can create conflicts with the directory live restore operation that is running in background. Note that the operational conflict resolution for files was described above.

When the system receives a path based operation, it traverses each sub-directory on the path and performs live-restore of the content this sub-directory atomically if needed.

Each directory content is restored atomically with respect to rest of file system operations. In this discussion "directory content" means all files within a directory. Sub-directories are not restored immediately, instead each sub-directory is created as an object with all its attributes being restored and also marked with RestoreInProgress attribute indicating that their content needs to be restored at a later time.

The following algorithm describes this process. The algorithm is executed atomically with respect to all other File System operations to RestorePathDir—access to this directory is locked for all other file system operations. Each sub-directory is accessed by its name and not by its OID.

```
Algorithm DirectoryContentLiveRestore(IN RestoreSourceDp,
            IN RestoreSourceDir, IN RestorePathDir)

1. If RestoreSourceDir has RestoreInProgress then
     a. Live restore each file:
          i. For each file F in RestoreSourceDir call
             PrepareFileForRestore(Complete path for F in
             RestorePathDir, <complete path for F in
             RestoreSourceDir>, RestoreSourceDp>)
     b. For each sub-directory S in RestoreSourceDir:
          i. If S does not exist in the RestorePathDir
          ii. Create S
          iii. Restore metadata of S from the source
              <RestoreSourceDp, RestoreSourceDir>
          iv. Record an attribute RestoreInProgress on S:
              RestoreInProgress = <RestoreSourceDp, Complete path of
              S in RestoreSourceDir)
     c. Mark directory live restore complete (remove
        RestoreInProgress attribute)
```

The following algorithm is used to resolve name space (path) conflict when user I/O is performed.

IO_Path identifies the object path within the file system name space used for an operation.

fsOperation identifies file system operation requested by user.

```
Algorithm ResolveNameSpaceOnLiveRestore(IN IO_Path, IN
                              fsOperation)

1. Break the IO_Path into individual tokens: IO_Path = <S1, S2, ...,
   Sn>.
   Note that Sn could be a directory or a file. Only the last token
   could be a file.
2. For each Si, i = 1 ... n
     a. If Si is Sn and is a file - resolve operation as described above
        as this file already been processed from the Live Restore
        point of view
     b. If Si is a directory and has RestoreInProgress, execute
        DirectoryContentLiveRestore(RestoreSourceDp,
        RestoreSourceDir, Complete path of Si)
```

When a user I/O arrives, a sub-path could have already been restored, in which case nothing needs to be done. This can happen when a sub-path was restored by a previous user operation or by the background directory live restore.

If the sub-path has not yet been restored, this means that this is the first user operation to this sub-path and the background live restore has not restored it. In this case the system locks the sub-path, and performs content live restore. When the background process catches up with this path, it will quickly determine that nothing needs to be done and moves on.

Block Level Live Restore

As mentioned previously, live restores can also occur at the block level. This is the preferred way to implement live restore to an entire site.

System Layers

The following definitions are used in describing a Block Level Live restore process.

Site P—primary site is being restored

Figure 19:
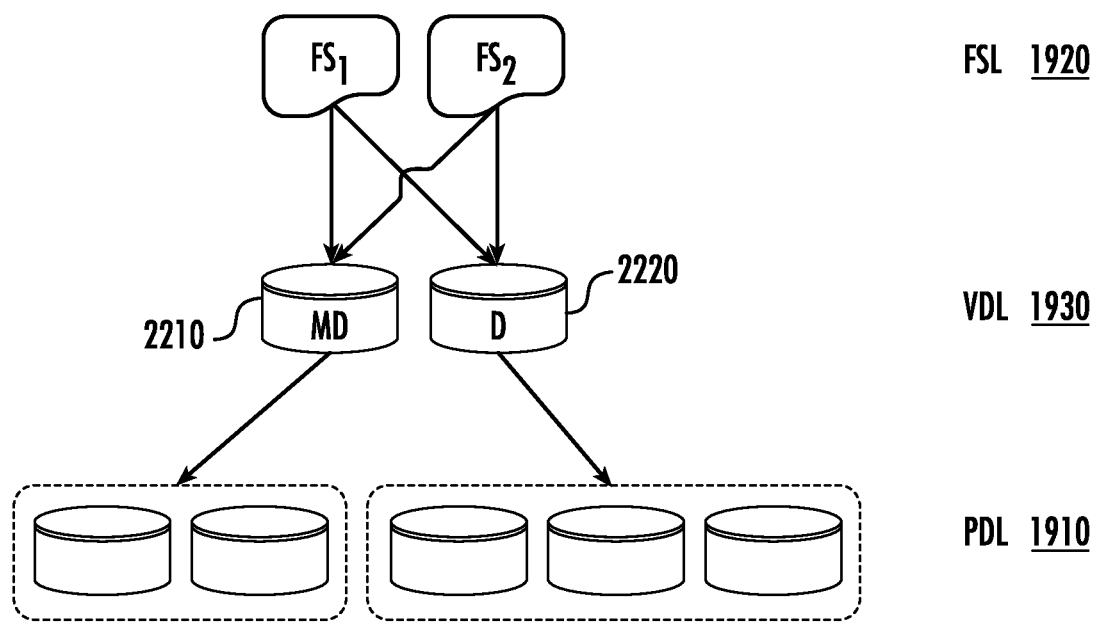
FIG. 19 illustrates storage layers in a site to be restored using a block level live restore.

Site R—remote (the intelligence node at the local location, or a remote location) site that is used as the source for the site restore operation Each site typically consists of the following functional layers: Physical Storage, File System, and a Virtual Disk Layer. FIG. 19 shows the three storage layers and their interrelationship.

Physical Storage Layer (PSL) 1910—the physical storage media, HDD, SSD, etc.

File System Layer (FSL) 1920—this is the layer implementing file systems. The FSL primarily uses storage for two reasons, to store file system metadata (internal file system and namespace information) and user data. In absence of user file I/O, FSL only needs metadata for its operation and does not access or modify storage extents used to store user data. Newer FSL implementations tend to support so-called TRIM operations. TRIM operations are used by FSL to notify physical storage that an extent is no longer is being used and can be reclaimed by the PSL.

Virtual Disk Layer (VDL) 1930—this is a layer that sits between Physical and File System layers and is used to virtualize physical storage configuration. VDL consumes physical storage and presents virtual disks to the File System layer. This allows site restore between sites that do not have the same storage (disk) configuration. VDL is also used to track extent allocation at each virtual disk presented to the file system layer. In this embodiment, VDL is described as a separate logical layer from the FSL for simplicity of the discussion. However, in some other implementation it could be implemented directly within the PSL or FSL. The VDL can be responsible for maintaining separate logical constructs for the metadata (MD) and user data (D) structures as described below.

A piece of information that can be extracted from File System is the extents that store metadata. However, this can be expensive. In a better approach, a File System can be implemented such that it stores its metadata on a separate storage device (or devices) dedicated for metadata only use. When combined with the This approach, with the VDL handling extent allocation tracking, allows quick identification of the metadata extents allocated/used by the File System layer.

Block Live Restore

VDL implements a Block Live Restore operation. It is used to restore a set of extents from one site to another. A list of extents is kept in an data Restore Extent Map. Given such a map, VDL copies data from a remote site at logical block level. The general algorithm is described below and shown in FIG. 20.

Site_P is a site P as described above.

Site_R is a site R as described above.

RestoreExtentMap is a data extent map keeping list of extents to be restored.

```
Algorithm BlockLiveRestore(IN RestoreExtentMap, IN Site_P, IN
                              Site_R)

1. For each extent in RestoreExtentMap, read data from the remote
   location Site_R and copy it locally to Site_P - (both primary
   and HA mirrored copy of the data are copied)
2. Update RestoreExtentMap with the information about extents that
   have been restored
```

Restore Extent Bitmap

One can use a variety of methods to keep track of extents restored and not restored. One approach is to use a bitmap. Use of a bitmap allows for random access to the extents being restored. Use of a bitmap in this instance is similar to how it is used for file live restore. Each bit in the Restore Extent Bitmap tracks the restore state for an extent that is restored atomically. For example, a bit with value of 0 marks an extent that needs to be restored, while a bit with a value of 1 marks an extent that has been restored. A zero bitmap (all bits set to zero) is created initially indicating that no extent has yet been restored. As live restore continues and individual extents are restored, the Restore Extent Bitmap is updated to reflect the state of restore for each extent.

In a copy-on-write file system data is never overwritten. Each modification is written to a newly allocated block. For these file systems the information about extents being restored (restored vs. need to be restored) can be implemented by using a single restore watermark, where extents below the watermark have been restored and extents above watermark have not.

If an I/O to an extent is received the following logic is used. The system protects newly restored and newly written user data by creating HA copy of the data.

I/O to an Extent being Live Restored

The following algorithm is used to perform user I/O to a block (extent) that is being restored.

IO_Region—identifies I/O operation block
IO_Type—identifies Read or Write operation

---

Algorithm IoToBlockBeingRestored(IN IO_Region, IN IO_Type: Read/Write, IN RestoreExtentMap , IN Site_P, IN Site_R)

1. Determine the restore extents that overlap with the user I/O using RestoreExtentMap
2. If extents have not been restored, restore needed extents
   a. Read data out from the Site_R source and write it to the destination Site_P - the primary and HA mirrored copy of the data
   b. Update RestoreExtentMap, marking extent restore completion
   c. If all extents are restored, complete the restoration process
3. Proceed as a normal IO
   a. In case of a READ, obtain the data and return to the user
   b. In case of a WRITE update primary and HA mirror copy of the data
   c.

---

Figure 21:
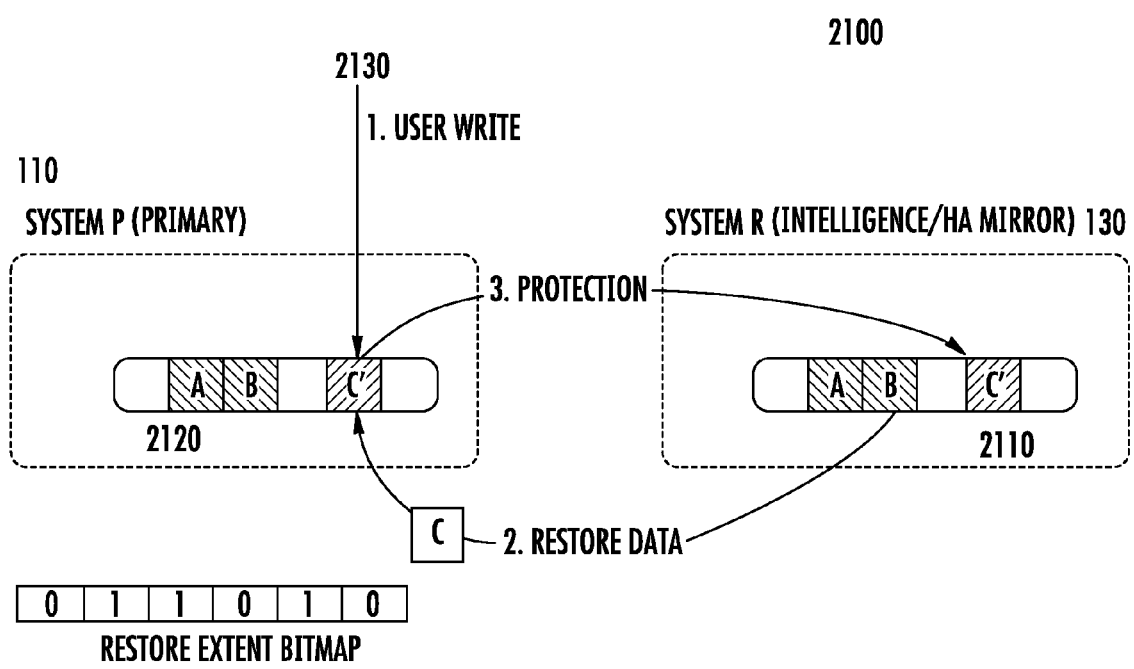
FIG. 21 is an example of a block restore using a bitmap to track status.

FIG. 21 illustrates an example of a block restore process 2100 when a Restore Extent Map is used to track restore information on the extents and a user I/O in progress (Write).

Data extents are restored from the remote pool 130 (from System R) to the primary pool 110 (to System P). The remote pool contains the user data to be restored 2110. In this implementation, the remote pool is divided on extents. System R thus tracks information about the used extents and this information is made available to the System R before the restore process starts. Data in the pool is restored extent by extent, atomically. The restore state of extents during live restore in this implementation is managed using an Restore Extent Bitmap 2135. For each extent to be restored, the source pool (System R) maintains a bit in the Restore Extent Bitmap to track whether an extent has been restored. A bit with a value of 1 marks an extent that has been restored, while a bit with value of 0 marks an extent that needs to be restored.

In FIG. 21, Extents A and B in the primary data 2120 have already been restored using a schedule based on previously gathered analytics, as stored in the source pool. Here, Block C is currently being modified by a user I/O operation 2130. Block C is restored, then data is merged with the users data, resulting in data C' which is then stored within both the primary and HA copy. As more of the file blocks are restored, the Restore Extent Bitmap is updated to reflect the state of the live restore in process.

Handling of FSL Issued TRIM Operation

As is described below, once the file system metadata is copied to the restore location, users are allowed to access their data which may then result in modifying the file system metadata. This can happen during the pruning of the file systems to be restored or later during user I/O to sites being restored. These operations can result in some of the metadata and data regions used by file system being freed. This might also result in a TRIM operation being issued to the VDL indicating that a region of a storage is no longer being in use by the FSL. When a TRIM operation is received for the metadata region, the system processes it normally as all metadata blocks have been restored. When a TRIM operation is received for a data region, the system finds all extents indicated by the region that are present in the Restore Extent Map and marks their restore as complete since they do not have to be restored. Notice that if an extent is not found in the map, then the corresponding extent live restore has completed or has not needed restore; in any case, no further actions on the restore map is needed.

The following algorithm is used to maintain the Data Extent Restore Map when a TRIM operation on a data region is received as a result of a user metadata prune or I/O operations. The following arguments are used:

RestoreExtentMap as described above
TrimDataRegion is the data region marked by FSL as not being in use.

---

Algorithm ProcessTrim(IN RestoreExtentMap, IN TrimDataRegion)

1. For data each extent E in TrimDataRegion that is also in RestoreExtentMap mark E restore state as complete (set corresponding bit to 1).

---

Site Restore

As been discussed briefly above, block live restore can also be applied to restoration of an entire site. The description below assumes that the File System layer uses a dedicated virtual device presented by VDL to store its metadata, and the FSL issues TRIM operations to the storage layer below to notify it about unused extents.

Figure 22:
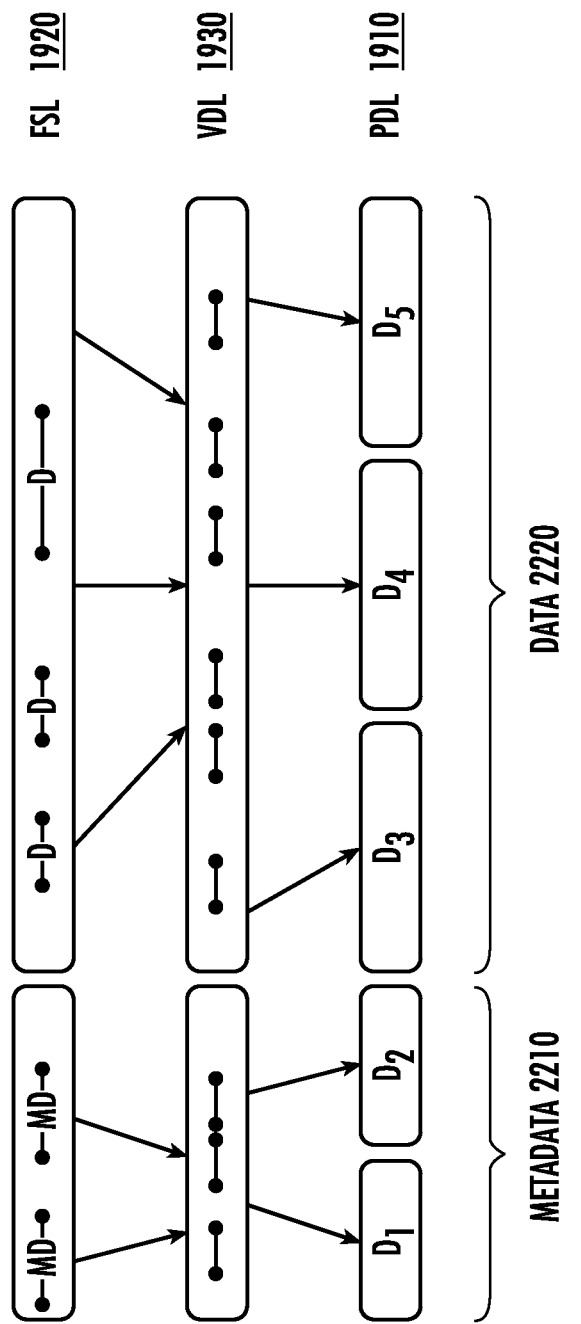
FIG. 22 shows metadata and user data logical separation.

FIG. 22 shows file system metadata (MD) 2210 and user data (DATA) 2220 separation and extent allocation tracking. There are logical regions of allocated space at the FSL which map to allocated extents at the VDL, which in turn map to used physical storage. The algorithm for site restore is as below (and shown in FIG. 23):

---

Algorithm SiteRestore (IN Site_P, IN Site_R)

1. Configure Virtual Disk layer at Site P matching configuration of what is being presented by VDL at site R.
2. Identify allocated/used Metadata extents at site R and copy them to the corresponding virtual device (s) to site P. Once this step completes, FSL on site P is ready to perform its operations that do not involve user data.
3. Obtain information about allocated/used data extents from the VDL at site R. This information is transferred to the VDL at site P. This information forms Restore Extent Map.
4. Perform file system pruning. In this step, users identify file systems that do not need to be restored. Not needed discovery points are also destroyed - for example, if site P is a Primary controller/system, then all discovery points are destroyed. If site P is an Intelligence controller/system, then user chosen discovery points are retained, while the rest are destroyed. Deletion of files, systems, and discovery points are FSL-level management operations that result in FSL metadata being modified, however, since all metadata has been restored, only site P metadata is modified. Another effect of deletion is that FSL might declare some of the data blocks as being no longer in use resulting in TRIM operations. As FSL issues TRIM operations, VDL updates its Restore Extent Bitmap, marking extents not needed for the restore.
5. Schedule background Block Live Restore based on the information in the Restore Extent Map.
6. Allow access to file systems by users.

Figure 24:
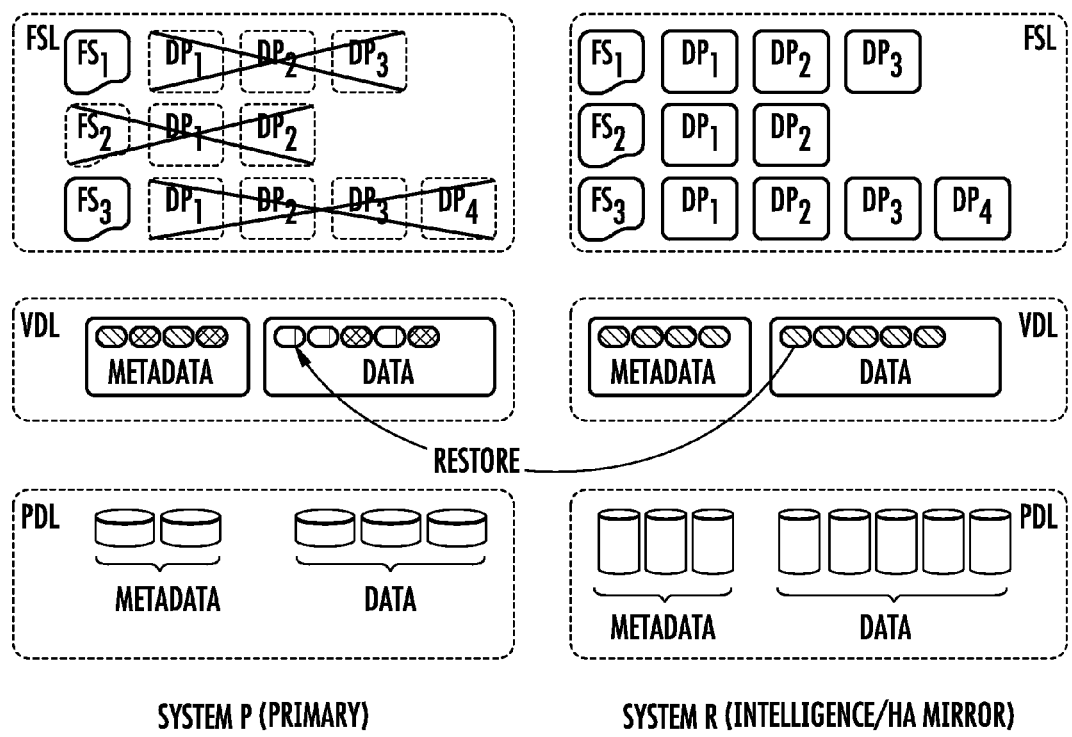
FIG. 24 shows the states of a restore live site in process.

FIG. 24 shows states of the P (primary) and R (Intelligence) after step 5.

The metadata was copied (only the used metadata extents were copied) from System R to System P. Fully restored blocks (or blocks not needing restore) are solid filled. Blocks that are marked as not being in use by FSL are identified with a cross pattern fill. Blocks that will need to be restored are identified with vertical stripe fill. VDL on the system P, maintains blocks to be restored (data needs to be copied from R to P) in Restore Extent Bitmap.

In the example shown in FIG. 23, a user has chosen not to restore $FS_2$ and all discovery points for $FS_1$ and $FS_3$ have thus been deleted by the system. This resulted in some of the metadata and data blocks being freed by the FSL and marked as no longer being in use. The FSL therefore issued TRIM operations for these regions. Since metadata blocks have fully been restored, the system process TRIM on the metadata blocks normally. Data blocks that have been reported by FSL as not being in use are marked as restore complete in the Restore Extent Map and will not be restored. As the background restore progresses, VDL on system P uses the Restore Extent Bitmap identifying the blocks to be restored and then to read that data from the remote system R and write it locally.

Notice that the physical storage configurations of System R and System P do not have to be the same. VDL abstracts the physical configuration presenting a virtual storage configuration to the FSL on both systems. Available physical metadata storage on system P must be at least the size of one at system R. Available physical data storage on system R must be at least needed to restore data after pruning has been complete.

It is to be understood that the above description is intended to be illustrative, and not restrictive. Many other embodiments will be apparent to those of skill in the art upon reviewing the above description. As but one example, the algorithms specify general steps, or one specific way of implementing a function or feature. Those of skill in the art will recognize that other approaches are possible. It should also be understood that the algorithms described are directed to the primary logic needed to carry out the stated functions. They do not describe all possible variations in implementation; nor do they specify all possible ancillary functions needed for a practical system such as invalid user-supplied inputs or invalid operational states. For example, error states can be handled in any convenient way.

The scope of the invention should, therefore, be determined only with reference to the appended claims, along with the full scope of equivalents to which such claims are entitled.

The invention claimed is:

1. A method for restoring data in a data-intelligent storage system that includes a primary storage node and intelligence storage node, each such node programmed to operate software, wherein
   a. the primary node software:
      i. intercepts data access requests;
      ii. mirrors data to the intelligence node referenced in the data access requests to provide high availability for data included in the data access requests;
      iii. executes in-line analytics on the data access requests to provide analytics metadata; and
      iv. directs the data access requests to a primary storage pool;
   b. the intelligence node software:
      i. stores mirrored data to an intelligence storage pool;
      ii. performs analytics on mirrored data and/or previously executed in-line analytics
      iii. creates discovery points within the intelligence pool; and
   c. upon indication of a need to restore data, the primary node and intelligence node cooperating to perform a live restore operation to the primary pool from the intelligence pool using the analytics metadata.

2. The method of claim 1 additionally comprising:
   a. restoring only object metadata first as a foreground process;
   b. allowing user I/O access to objects prior to user data associated with the object being completely restored; and
   c. restoring user data as a background process.

3. The method of claim 2 additionally comprising:
prioritizing user data being restored based on the analytics metadata.

4. The method of claim 2 additionally comprising:
using the analytics metadata and user I/O operations to prioritize regions of a user data object being restored.

5. The method of claim 3 additionally comprising:
   a. restoring multiple objects at a time; and
   b. restoring user data using the analytics metadata and user I/O to determine a priority for restoring the multiple objects.

6. The method of claim 1 additionally comprising:
   a. intercept subsequent live file requests; and
   b. force live restore from a discovery point, wherein the discovery point further includes source data.

7. The method of claim 2 additionally comprising:
using a restore bitmap to track restore progress to allow random I/O to the object before the object is completely restored.

8. The method of claim 7 wherein the restore bitmap represents regions that support automatic atomic restoration.

9. The method of claim 1 additionally comprising:
   a. obtaining a size of a file to be restored from the intelligence pool;
   b. creating a new file in a RestorePath in the primary pool with an object identifier FIleOID;
   d. restoring metadata for a user data object to be restored;
   e. creating a RestoreLink file having an object identifier and a RestoreLinkOID;
   f. saving at least the restore size, FileOID and zero restore bitmap in the RestoreLink file; and
   g. saving the RestoreLinkOID on a corresponding attribute in new file being restored in the primary pool.

10. The method of claim 1 additionally comprising:
performing a live restore operation on an individual file.

11. The method of claim 10 wherein the file live restore operation further comprises:
   a. restoring metadata related to the file atomically;
   b. allowing user I/O to the file being restored;
   c. continuing to restore user data related to the file as a background task.

12. The method of claim 10 wherein the file live restore operation further comprises:
   a. prioritizing restore of individual blocks within the file being restored based on user I/O and the previously gathered analytics.

13. The method of claim 1 wherein the intelligence node software further performs a directory/file system live restore operation on a directory and/or file system level to restore multiple files and/or directories in parallel.

14. The method of claim 13 wherein the directory/file system live restore operation further comprises:
   a. creating directory/file system metadata;
   b. allowing user I/O to the file system/directory being live restored as a background task; and
   c. restoring individual files as a file live restore operation.

15. The method of claim 13 wherein the directory/file system live restore operation further comprises:
   a. prioritizing restoration of multiple files within a directory/file system based on user I/O and the previously gathered analytics.

16. The method of claim 1 additionally comprising perform block level live restore for restoring data extents from a recovery site to a primary site.

17. The method of claim 16 wherein the block level live restore further comprises:
   a. restoring metadata for the site atomically, including system metadata for file systems and discovery points;
   b. transferring an allocated extents map from a Virtual Disk Layer (VDL) on the recovery site to the VDL on the primary site; and
   c. allowing user I/O to the primary site while performing restore of user data each extent as a background task.

18. The method of claim 17 additionally comprising:
   a. pruning resulting metadata; and
   b. resolving TRIM operations to the VDL as result of either such pruning or as a result of allowing user I/O to the site while it is being restored.

19. The method of claim 16 wherein the block level live restore further comprises:
   a. prioritizing restore of each extent based on the user I/O and previously gathered analytics.

* * * * *